US011726384B1

(12) United States Patent
Stone

(10) Patent No.: US 11,726,384 B1
(45) Date of Patent: *Aug. 15, 2023

(54) LOW POWER COMPACT OPTICAL COMMUNICATION AND COLLISION AVOIDANCE SYSTEMS

(71) Applicant: Wavefront Research, Inc., Northampton, PA (US)

(72) Inventor: Thomas W. Stone, Hellertown, PA (US)

(73) Assignee: Wavefront Research, Inc., Northampton, PA (US)

( * ) Notice: Subject to any disclaimer, the term of this patent is extended or adjusted under 35 U.S.C. 154(b) by 119 days.

This patent is subject to a terminal disclaimer.

(21) Appl. No.: 17/543,678

(22) Filed: Dec. 6, 2021

Related U.S. Application Data

(60) Continuation-in-part of application No. 15/589,428, filed on May 8, 2017, now Pat. No. 11,194,224, which is a continuation of application No. 15/172,991, filed on Jun. 3, 2016, now abandoned, which is a division of application No. 14/216,402, filed on Mar. 17, 2014, now abandoned.

(60) Provisional application No. 61/799,998, filed on Mar. 15, 2013.

(51) Int. Cl.
| | | |
|---|---|---|
| *H04B 10/11* | (2013.01) | |
| *G02F 1/31* | (2006.01) | |
| *H04B 10/25* | (2013.01) | |
| *G02B 27/09* | (2006.01) | |
| *H04B 10/50* | (2013.01) | |
| *H04B 10/66* | (2013.01) | |
| *H04Q 11/00* | (2006.01) | |

(52) U.S. Cl.
CPC ............. *G02F 1/31* (2013.01); *G02B 27/095* (2013.01); *H04B 10/11* (2013.01); *H04B 10/2589* (2020.05); *H04B 10/50* (2013.01); *H04B 10/66* (2013.01); *H04Q 11/0003* (2013.01)

(58) Field of Classification Search
None
See application file for complete search history.

(56) References Cited

U.S. PATENT DOCUMENTS

| | | | | |
|---|---|---|---|---|
| 5,771,320 | A * | 6/1998 | Stone | G02F 1/3523 385/16 |
| 6,275,145 | B1 * | 8/2001 | Rogozinski | B60Q 1/547 340/471 |
| 6,353,489 | B1 * | 3/2002 | Popovich | G02B 5/124 359/530 |
| 6,680,788 | B1 * | 1/2004 | Roberson | G02B 26/0875 372/50.1 |
| 7,978,981 | B2 * | 7/2011 | Buckman | H04B 10/801 398/118 |
| 7,983,565 | B2 * | 7/2011 | Varshneya | G01S 17/86 398/189 |
| 8,301,027 | B2 * | 10/2012 | Shaw | H01S 5/423 398/118 |
| 11,194,224 | B2 * | 12/2021 | Stone | H04B 10/2589 |

(Continued)

*Primary Examiner* — Jai M Lee
(74) *Attorney, Agent, or Firm* — Culhane Meadows PLLC; Orlando Lopez

(57) ABSTRACT

Low power and/or low footprint optical communication technologies that support short to medium range exoatmospheric communications and provide bidirectional communication with nearly spherical coverage.

6 Claims, 20 Drawing Sheets

(56) References Cited

U.S. PATENT DOCUMENTS

| | | | |
|---|---|---|---|
| 2001/0043381 A1* | 11/2001 | Green | H04B 10/2587 398/126 |
| 2002/0141011 A1* | 10/2002 | Green | H04B 10/1125 398/118 |
| 2003/0058506 A1* | 3/2003 | Green | H04B 10/1125 398/126 |
| 2003/0147652 A1* | 8/2003 | Green | H04Q 11/0005 398/58 |
| 2004/0234268 A1* | 11/2004 | Oleh | H04B 10/1149 398/118 |
| 2005/0063056 A1* | 3/2005 | Kralik | H04Q 11/0005 359/484.06 |
| 2005/0129410 A1* | 6/2005 | Wilsey | H04B 10/1143 398/153 |
| 2007/0177880 A1* | 8/2007 | Karasikov | H04B 10/2587 398/170 |
| 2007/0242337 A1* | 10/2007 | Bradley | G08G 1/161 340/5.1 |
| 2008/0069568 A1* | 3/2008 | Dolcetta | H04B 10/1121 398/131 |

\* cited by examiner

LOW POWER COMPACT OPTICAL COMMUNICATION AND COLLISION AVOIDANCE SYSTEMS

CROSS-REFERENCED TO RELATED APPLICATIONS

This application is a continuation in part of co-pending U.S. patent application Ser. No. 15/589,428, filed on May 8, 2017, entitled LOW POWER COMPACT OPTICAL COMMUNICATION AND COLLISION AVOIDANCE SYSTEMS, which is a continuation of co-pending U.S. application Ser. No. 15/172,991, filed on Jun. 3, 2016, entitled LOW POWER COMPACT OPTICAL COMMUNICATION AND COLLISION AVOIDANCE SYSTEMS, which in turn is a divisional of U.S. patent application Ser. No. 14/216,402, filed on Mar. 17, 2014, now abandoned, which in turn claims priority to and benefit of U.S. Provisional Application No. 61/799,998, filed on Mar. 15, 2013, the contents of which are incorporated herein by reference in their entirety for all purposes.

BACKGROUND

These teachings relate generally to low power and/or low footprint optical communication systems.

It is increasingly desirable to be able to communicate over short distances with very low power dissipation and footprint as well as being covert. This is particularly valuable for communication between satellites, micro- and nano-satellites, UAVs, aerial and ground vehicles, and fixed platforms. Several technologies are described here that that give flexibility with low power dissipation and tiny footprints for such optical communication scenarios. These technologies support a Low Power Angular Spectrum Steered (LPASS) optical communications system that can be VCSEL-based for short range applications and switched higher power laser-based for longer range applications. The second technology is a radiation hardenable retromodulator technology that offers increased system flexibility when combined with the LPASS technology.

There is a need for low power and/or low footprint optical communication technologies that support short to medium range communications with radiation hardenable component capability. There is also a need to provide bidirectional communication with nearly spherical coverage and the ability to locate and track vehicles if their location is lost, and to perform sense-and-avoid and identify-friend-or-foe functions among satellites, microsatellites, UAVs, aerial, ground, and fixed platforms.

SUMMARY

The various embodiments of the present teachings disclose low power and/or low footprint optical communication technologies that support short to medium range exoatmospheric communications and provide bidirectional communication with nearly spherical coverage.

For a better understanding of the present teachings, together with other and further objects thereof, reference is made to the accompanying drawings and detailed description.

DETAILED DESCRIPTION

Several embodiments are described herein that that give flexibility with low power dissipation and tiny footprints for such optical communication scenarios. These technologies support a Low Power Angular Spectrum Steered (LPASS) optical communications system that can be VCSEL-based for short range applications and switched higher power laser-based for longer range applications. Another embodiment is a radiation hardenable retromodulator technology that offers increased system flexibility when combined with the LPASS technology.

The LPASS approach takes advantage of a dense array of sources (or a single source switched among a dense spatial array of emitting positions such as optical fibers in an array) that is located near the back focal plane of an infinite conjugate imager. This is exactly the case encountered at WRI in developing dense VCSEL-based board to board interconnects, and one such prototype is shown in the photograph in FIG. 1.

Figure 1:
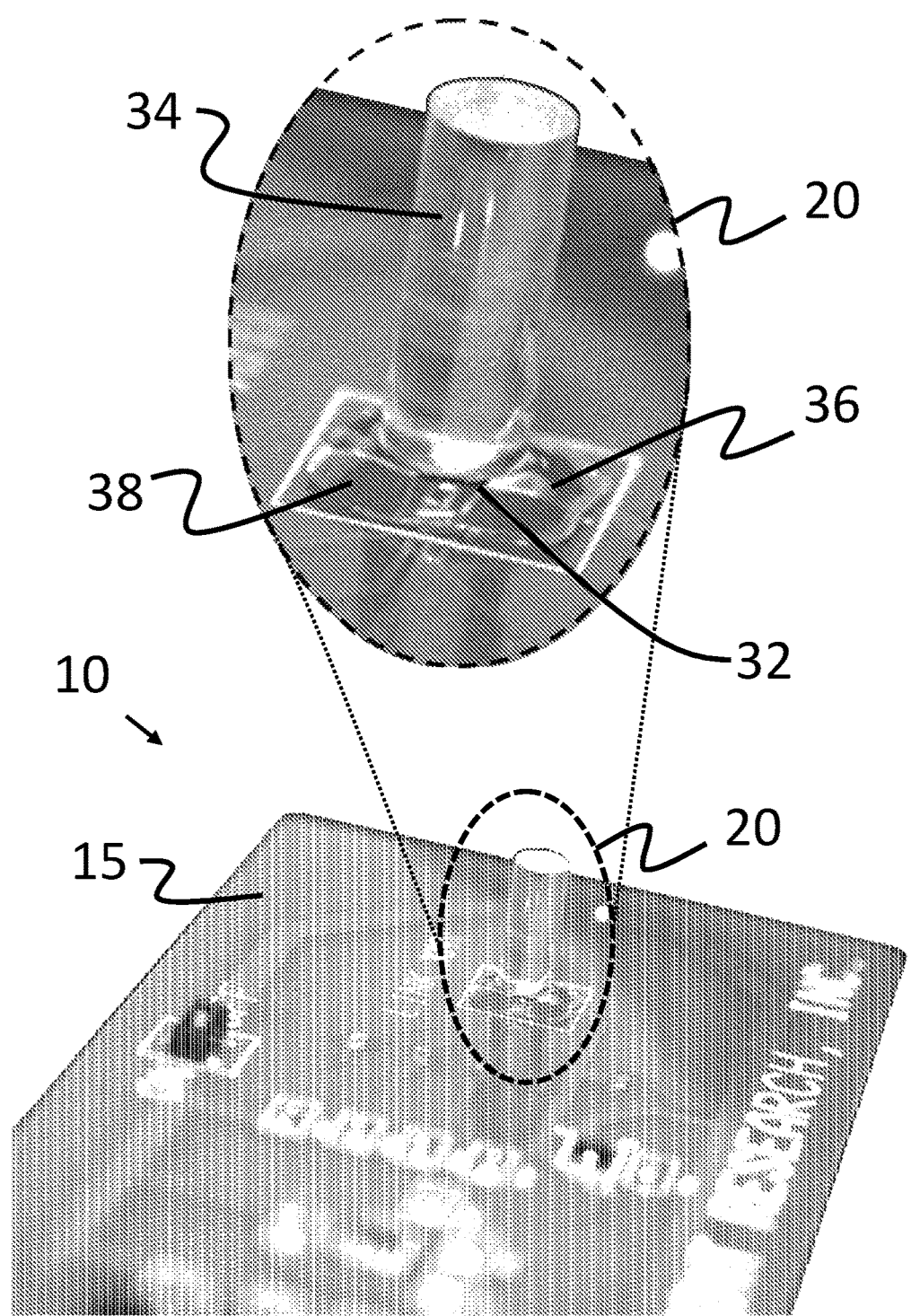
FIG. 1 shows an embodiment including an Angular Spectrum Steered Optical Communication Transmit Module shown on a Circuit Board.

Referring to FIG. 1, an array of VCSELs (Vertical Cavity Surface Emitting microLasers) 32 is located in the proximity of the back focal plane of an infinite conjugate imager 34 which maps each VCSEL into a narrow beam covering a small portion of the forward solid angle. In the embodiment 10 the pixels 32 are connected to circuitboard 15 using leads 36. The imager 34 is aligned and mounted over the pixel array 32 and held in place by a proxy 38 which acts as a housing. The entire module can be millimeters across. Dense 2-D VCSEL arrays that are row-column addressed can be used in many of the embodiments (described below). In other embodiments individually addressable VCSEL arrays are used.

Consider a dense 256×256 array of matrix addressable VCSELs near the focal plane of an infinite conjugate imager. When any one VCSEL is switched on, its spatial location is mapped in to a small nearly plane wave slightly diverging about a central angle that is unique to its spatial location in the array. A common drawback of VCSELs is that they generally only emit milliwatts (e.g., 2-80 milliwatts). So the key to this LPASS device configuration is to divide the field of view (FOV) into say 256×256=65536 solid angle "segments". By mapping the 256×256 VCSEL array into this FOV with one VCSEL emitting 16 mW (for example) into a single solid angle segment, the field can be covered exactly the same as it would be with a single emitter of 65536×16 mW, or more than 1 kilowatt, spread over the entire field. However now only the solid angle segment corresponding to the single or few VCSELs that are driven at a given instant receives light and the power dissipated is only in the tens of milliwatts regime. This LPASS transmit module embodiment is illustrated in FIG. 2.

Figure 2:
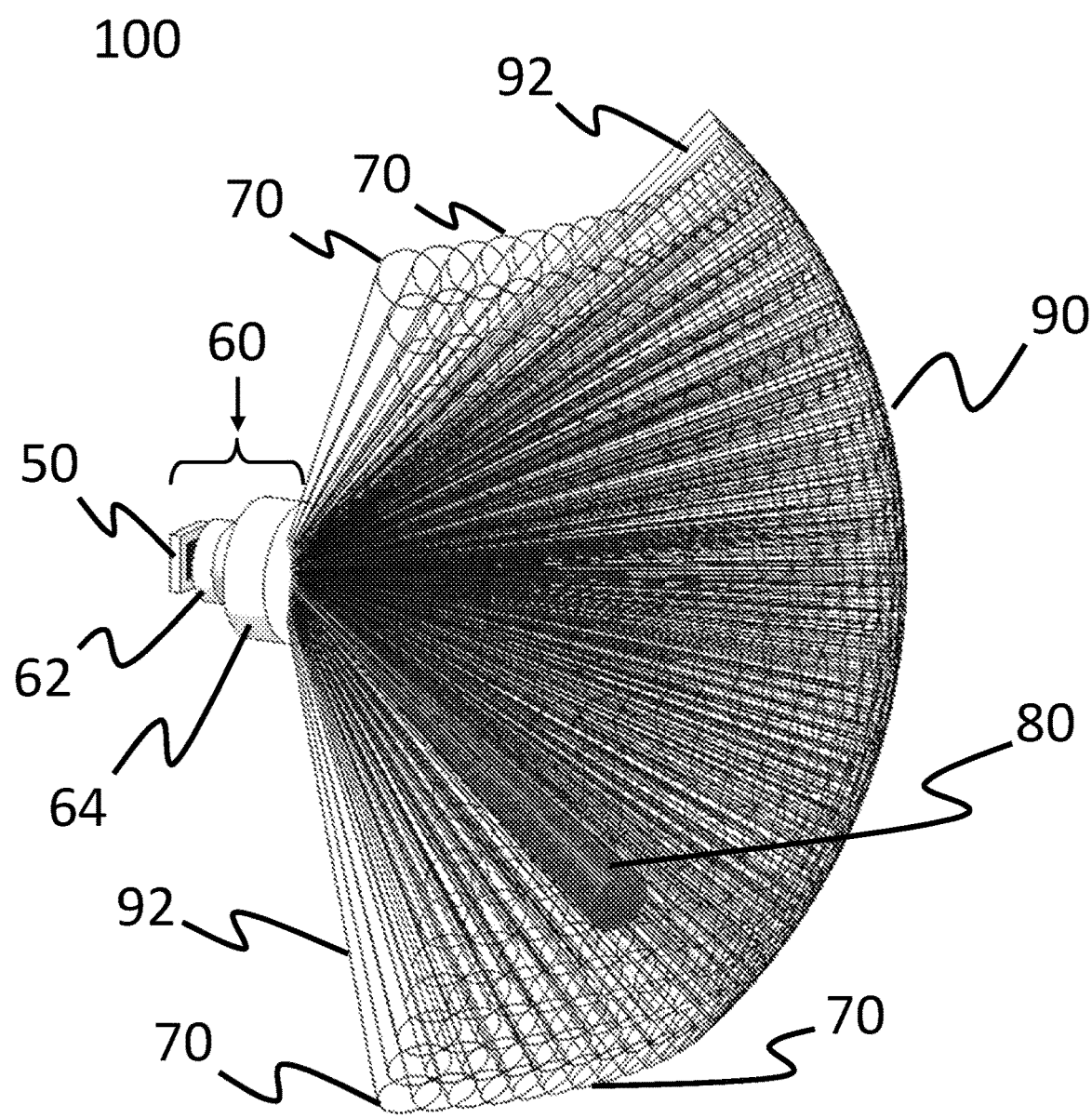
FIG. 2 shows an embodiment of a Low Power Angular Spectrum Steered (LPASS) Optical Communication Transmit Module Operation of these teachings.

Reference is now made to embodiment 100 FIG. 2, where pixel array 50 is located near the focal plane of infinite conjugate imager 60 which in this case is shown to consist of lens elements 62 and 64. Light emitted from each of the individual VCSEL elements in array 50 is imaged by imager 60 into a unique member 70 of an angular spectrum of beams 90. Each of these neighboring members 70 of the angular spectrum of beams can overlap somewhat with its neighbor as shown in FIG. 2. FIG. 2 shows the case of embodiment 100 where one VCSEL in VCSEL array 50 is turned on and it emits light into beam 80 which is one of the members of the angular spectrum of beams 90. In embodiment 100 each VCSEL in VCSEL array 50 emits its light into a separate member 70 of the angular spectrum of beams 90 and together all of the beams 70 fill a solid angle 90 which is bounded by the side surfaces 92 of the angular spectrum of beams 90. This forms the basis of an incredibly compact and low power communication technique that is useful for relatively short or medium distances. In one embodiment of the case of a first vehicle communicating or talking to a second vehicle, the VCSELs can be rastered in patterns, one or a number at a time, until a return such as from a retromodulator on the second vehicle, is received. Then communication is established, and only tens of milliwatts is being expended with the same result as if a single wide angle beam of >1000 watts was being transmitted over the entire field of view (FOV) 90.

In related embodiments without retromodulators, the first vehicle transmits using an LPASS transmit module 100 and on the receiving second vehicle a similar wide angle infinite conjugate imager is matched to a detector array containing, say, 32×32 detectors to form an LPASS receive module. This LPASS receive module on a receiving vehicle not only converts the received optical signal to an electrical signal, but it also identifies the general location (direction) of the transmitting vehicle based on which detector element in the array receives the signal from the first vehicle. Knowing this location greatly speeds up establishing the return communication through an LPASS transmit module on the second vehicle to an LPASS receive module on the first vehicle.

The term "vehicle" is used herein to represent, without limitation, any host aircraft, spacecraft, automobile, carrier, animal, person, ball, object, ground station, projectile, etc. that can be equipped with an LPASS transmit and/or receive and/or transceiver module.

The term "beams" is used herein interchangeably with "solid angle beams" to represent each of the individual beams 70 in the angular spectrum of beams that span the solid angle 90 of beams.

The term "imager" is used herein to represent optical imagers made of one or more elements any of which can be, without limitation, refractive, diffractive, gradient index, reflective or other types of optical elements. Since LPASS modules are typically use to communicate at distances long compared to the focal length of the imager, the imagers are typically substantially infinite conjugate imagers. However in embodiments of shorter communication distances the imagers 60 begin to depart from infinite conjugate imagers and start to become more like finite conjugate imagers. In any case the imagers are used to image light from each VCSEL into the desired solid angle beam for transmit LPASS modules; and for receive LPASS modules the imagers are used to focus light received from LPASS transmit modules onto the detector or receiver arrays with the desired spot size.

The term "VCSEL" is used herein not only to represent Vertical Cavity Surface Emitting microLaser devices but is also used to represent other sources of light including, without limitation, LEDs, SLEDs, lasers, optical fibers, waveguides, and other sources or emitters of electromagnetic radiation.

In the embodiment shown in FIG. 2, a dense matrix addressable VCSEL array 50 is located near the back focal plane of a wide angle infinite conjugate imager 60 which maps the output of each VCSEL in the array into a beam which slightly overlaps the output of the neighboring VCSELs. System 100 of FIG. 2 shows the case where an array of 20×20 VCSELs is shown mapped in to a 120-degree×120-degree FOV. In practice a larger matrix addressable VCSEL array, such as 256×256, could be used over the same FOV, but the 20×20 VCSEL array embodiment was shown for clarity.

With the addition of versatile search and tracking algorithms and rich system tradeoffs discussed herein below, these teachings have the potential to provide bidirectional communication among vehicles using compact LPASS modules with low power dissipation and small footprints. Further these teachings can be used to find the location of vehicles and track them while they are moving and communicating. Dithering neighboring VCSELS surrounding the VCSEL that is currently communicating from vehicle to vehicle will reveal which way the vehicles are moving relative to each other according to which neighboring VCSEL the communication is handed off to. This process is facilitated by the slight overlap between each VCSEL's solid angle and its neighbor's. In addition, since the communication is steered over a very small solid angle at a time, the communication is difficult to intercept. These and other advantages of the LPASS technologies are described herein below.

Figure 3:
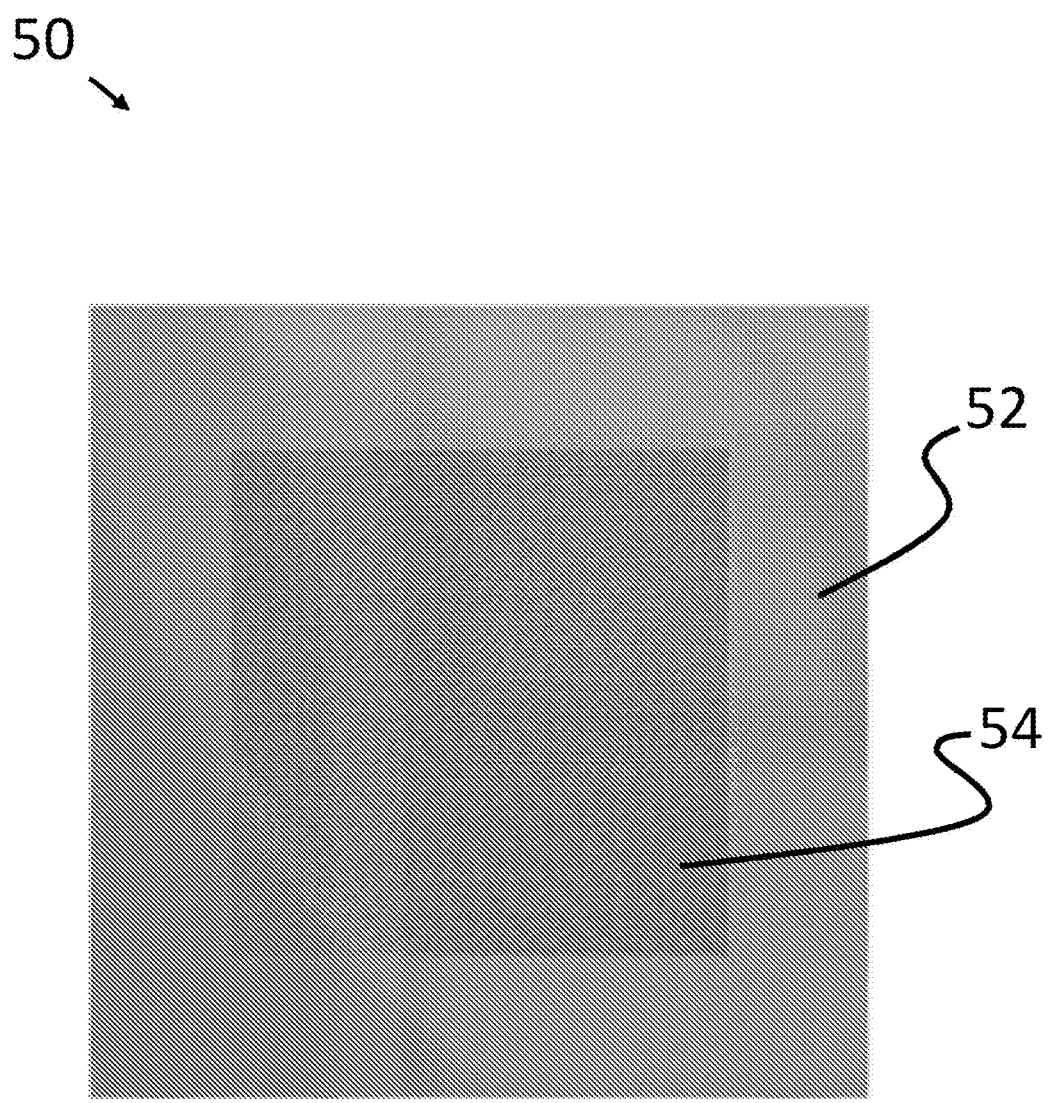
FIG. 3 shows a Dense Matrix Addressable VCSEL Array used in one embodiment of the LPASS of these teachings.

Dense VCSEL arrays 50 of large dimension, illustrated in FIG. 3, are used in some embodiments of the LPASS transmission modules. The densely spaced array of VCSEL devices 54 resides on die 52. The periphery of die 52 is typically used to place bonding pads used to electrically connect to the VCSEL devices in the array. With row-column (matrix) addressing, there is typically only a single exiting trace required for each row and for each column. To turn on any given VCSEL, current is applied through its particular row and column. This allows for very large arrays of VCSELS (e.g., 64×64 or 256×256) that are closely spaced (e.g., 50 micron array pitch).

This addressing scheme avoids the interconnect complexity and array density limits imposed by individually addressable array architectures although individually addressed VCSEL arrays are used in some LPASS transmit module embodiments. For example, a 256×256 matrix addressable VCSEL array with a 75 micron device pitch fits on a die that is <2 cm across and is engineerable. It is typical for individual VCSELs to emit several, tens, or in some cases 100 or more milliwatts and we believe that with engineering and advanced structures that powers approaching 100 mW per VCSEL can be obtained. These high power densities per device are also made practical because only one or a relatively small number of pixels compared to those devices present in the array need to be powered at a time which greatly reduces thermal issues that can limit VCSEL power when many or all VCSEL devices in an array are simultaneously powered.

Figure 4:
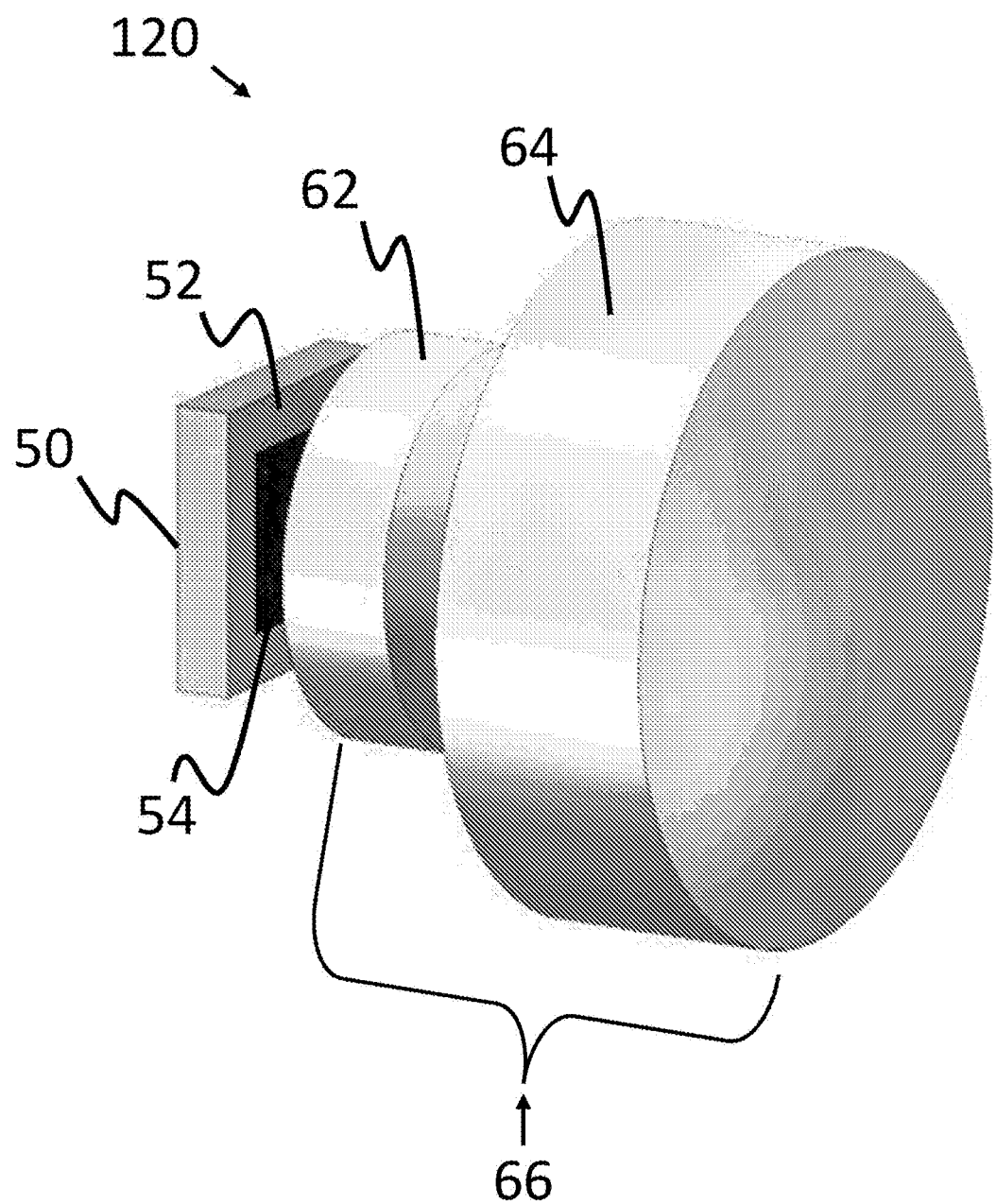
FIG. 4 shows an embodiment of the optical transmitting system of these teachings including a Wide Angle Infinite Conjugate Imager In front of VCSEL Die.

FIG. 4 illustrates an embodiment of the LPASS transmit module 120 including a wide angle imager 60 in front of a VCSEL array 50. This wide angle infinite conjugate imager maps the output of each of the VCSEL sources into a unique solid angle beam. The neighboring VCSELs are imaged into neighboring solid angle beams. This illustration shows the infinite conjugate imager in solid form. This 2-element imager maps the devices in the VCSEL array over a wide area, for example, 120 degrees by 120 degrees. The imager can be fabricated in any single qualified radiation hard material transparent at 850 nm (or other laser emission wavelength). The imager can be the same or roughly twice the lateral dimension of the VCSEL die or more.

Figure 5:
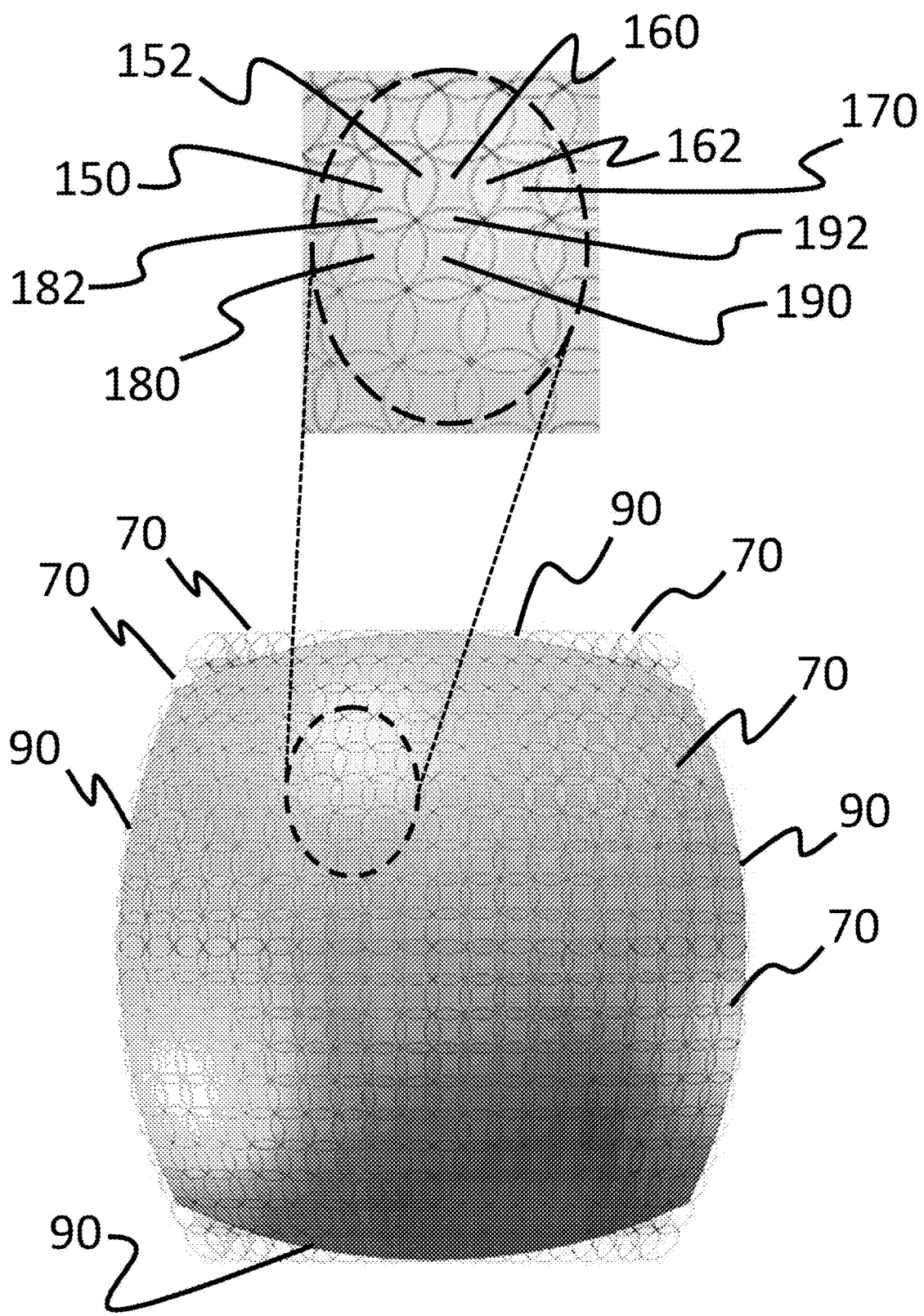
FIG. 5 shows the Angular Spectrum of Beams Formed by All the VCSELs in a 20×20 VCSEL array in one embodiment of the optical transmitting system of these teachings.

FIG. 5 illustrates an angular spectrum of beams formed by all the VCSELs in a 20×20 VCSEL array. Much larger arrays can be used (e.g., 256×256) but the smaller array size is shown here for clarity). For example, a 128×128 VCSEL array can cover a 90-degree×90-degree solid angle with the power in each VCSEL being spread over a divergence angle of less than 1 degree and still maintain overlapping beam positions. Such overlapping can eliminate uncovered or gap regions. For example, beam 190 overlaps with beam 160 in region 192. Similarly, beam 160 overlaps with beam 150 in region 152; and overlaps with beam 170 in region 162. And beam 182 overlaps with beam 150 in region 182, etc.

In the embodiment shown in FIG. 5, all possible VCSEL output beams are shown with a superimposed 90-degree× 90-degree solid angle 90. It is seen that this entire solid angle is covered by the many VCSEL beams. In practice a larger dimension VCSEL array would typically be used in many embodiments, such as 256×256.

Figure 6:
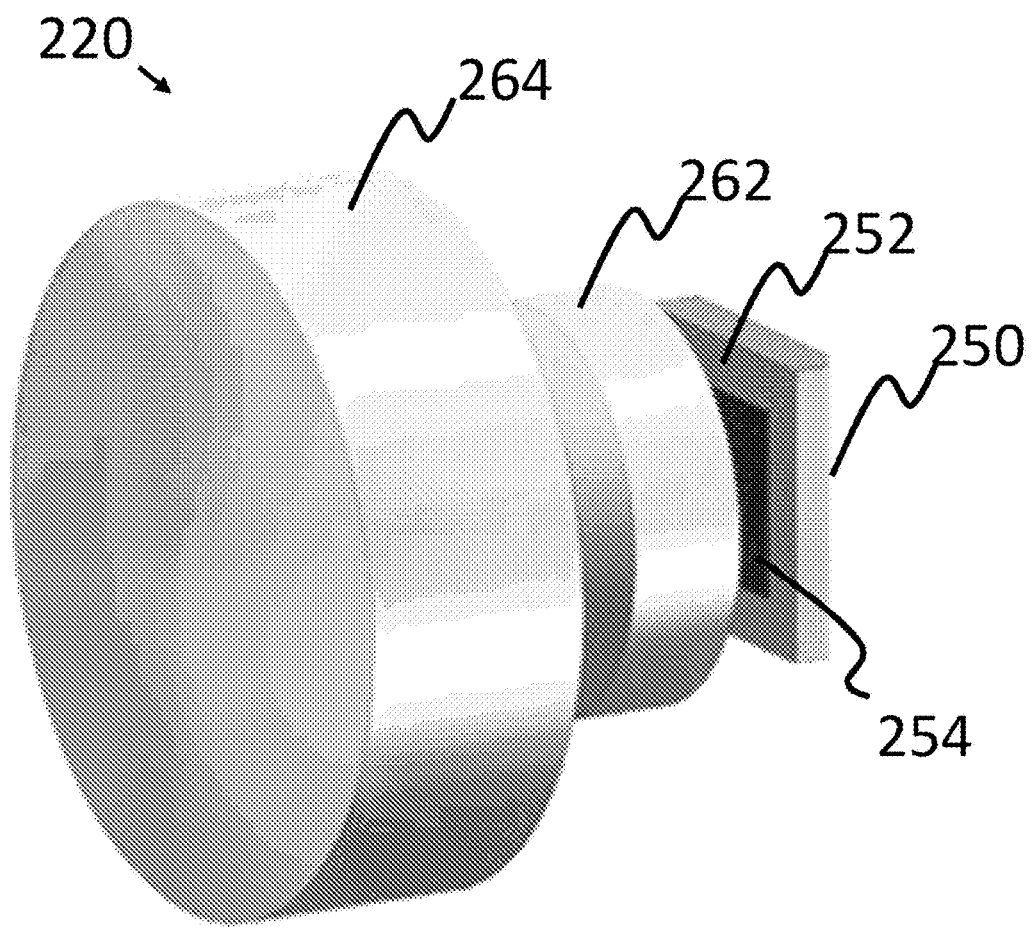
FIG. 6 shows one embodiment of the LPASS Wide-Angle Receive Module of these teachings.

One embodiment of the LPASS Receive module is illustrated by system 220 in FIG. 6, and consists of a wide angle infinite conjugate imager made up of elements 262 and 264 in front of a pixellated detector or receiver array 250. The pixelated detector array 250 includes an array of one or more detector devices in device array 254 on die or mount 252. The FOV of the receive module can be 120 degree×120 degree or wider. While there can be a single integrating detector or receiver in the detector or receiver array 250, the use of a pixellated detector, e.g., 32×32, not only detects the incident power but also identifies the approximate location of the transmitting vehicle. This provides a very valuable tradeoff in the search mode where now only a small local region needs to be interrogated further to identify the exact transmitting vehicle location. An optical notch filter that transmits the wavelength used in the LPASS transmit modules can be incorporated in the module (for example as a separate filter element or on the outer imager surface) to cut down on the background signal. In addition passive and active filters, PLLs, heterodyne and other detection schemes known in the art can be used to optimize the low light level performance of the link. The transmitted signal can have specific or coded (e.g., per vehicle coded) carrier frequencies and optimal modulation schemes known in the art can be readily incorporated in the LPASS communication system.

Figure 7:
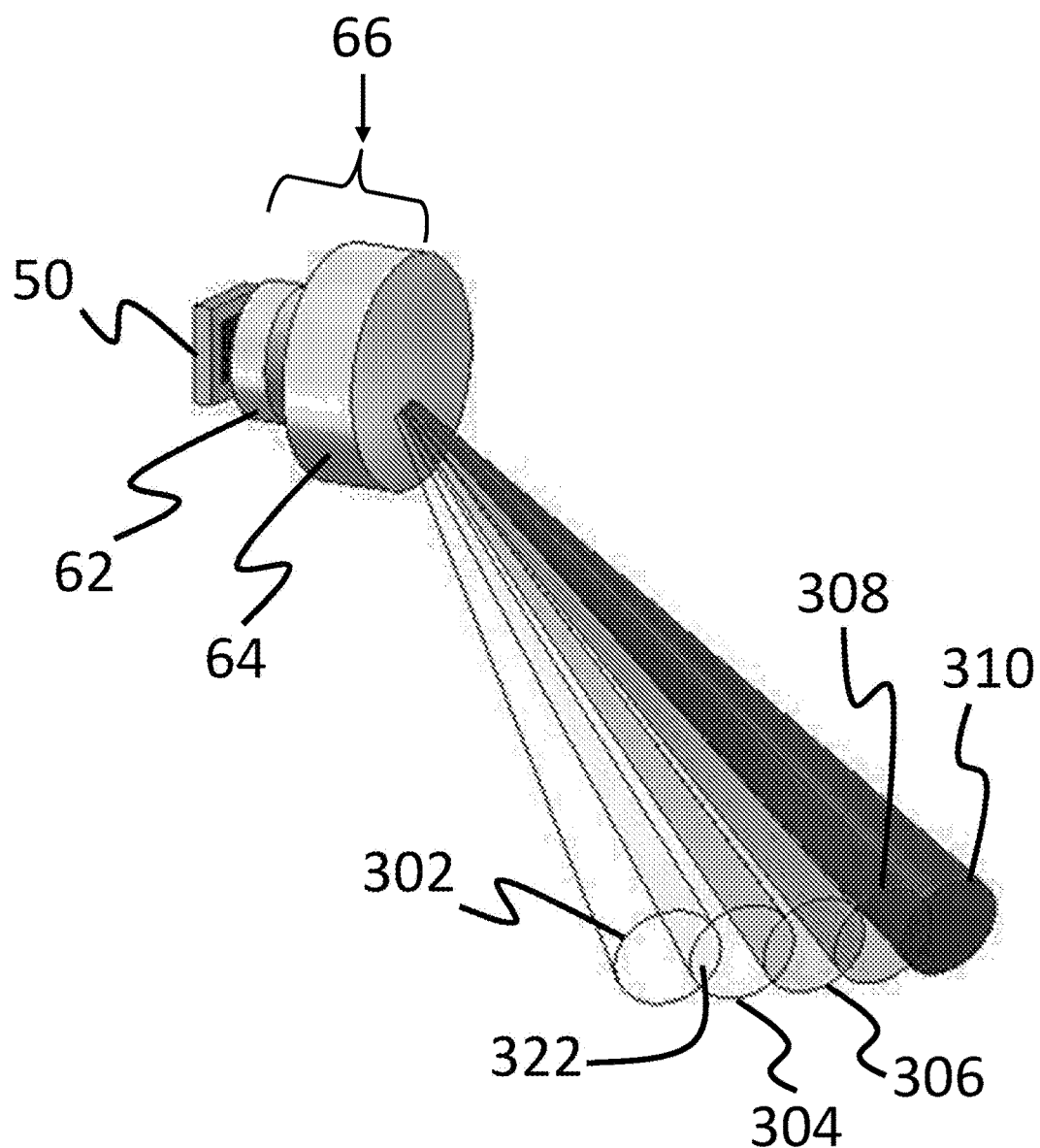
FIG. 7 shows Low Power Angular Spectrum Steered (LPASS) Optical Communication Transmit Module Operation-Search and Tracking Modes, using one embodiment of the system of these teachings.

LPASS search and tracking modes are illustrated in FIG. 7. In one set of search and tracking modes, one VCSEL is turned on at a time in the LPASS module on a first vehicle in a rapid raster scan to locate the angular position of a communicant second vehicle. This is illustrated by the operation of the transmit LPASS module shown in FIG. 7. Beam 310 emanates from the pixel that is currently on. In the prior time step beam 308 was on. In the time step before that beam 306 was on. In the time step before that beam 304 was on. In the time step before that beam 302 was on, and so forth. Overlapping regions such as region 322 shared between beams 302 and 304 eliminate dead spots and can be used to gracefully transition from one beam position to the next. Once the location is identified by a return signal or communication, the neighboring VCSELs are periodically interrogated to identify which next VCSEL will cover the upcoming position of the communicant module which is moving relative to the first module.

There are various techniques for obtaining the return signal. For example, the Segmented LPASS Receive Module shown in FIG. 6 on the second vehicle immediately indicates the local angular area from which the incoming beam from the first module originates. There is only a small search region left for an associated LPASS module to search in order to establish a return link to the originating vehicle. This can be accomplished with an LPASS transmit module on the second vehicle communicating with an LPASS receive module on the first vehicle. Pairs of transmit and receive LPASS modules on a given vehicle can be replaced by a single transceiver LPASS module where emitters and detectors are interspersed, or for example, where VCSELS are used both as emitters and detectors. In another scenario, the first vehicle can slowly raster its ID code in search of daughter second vehicles, while second vehicles, when in the beam of the first vehicle, rapidly raster a response in the small local search window. When the 2-way link is established, two communicants know each other's location and identity, and periodic neighbor VCSEL interrogations track the link as the vehicles move relative to each other. In an alternate scenario, corner cube reflectors are used to provide a return signal for synchronization. A still further approach is to use a retro-modulator on the second vehicle so data can be transferred, even without an LPASS transmit module on the second vehicle.

Once the angular location of the communicant is known, the link is established in a variety of ways, such as the communicant using a similar LPASS transmit module or a retromodulator to talk back. Hand-off to the neighboring channel is accomplished gracefully due the overlap of the neighboring channels. Intermittent polling of the neighboring channels establishes the relative vector for tracking.

Figure 8:
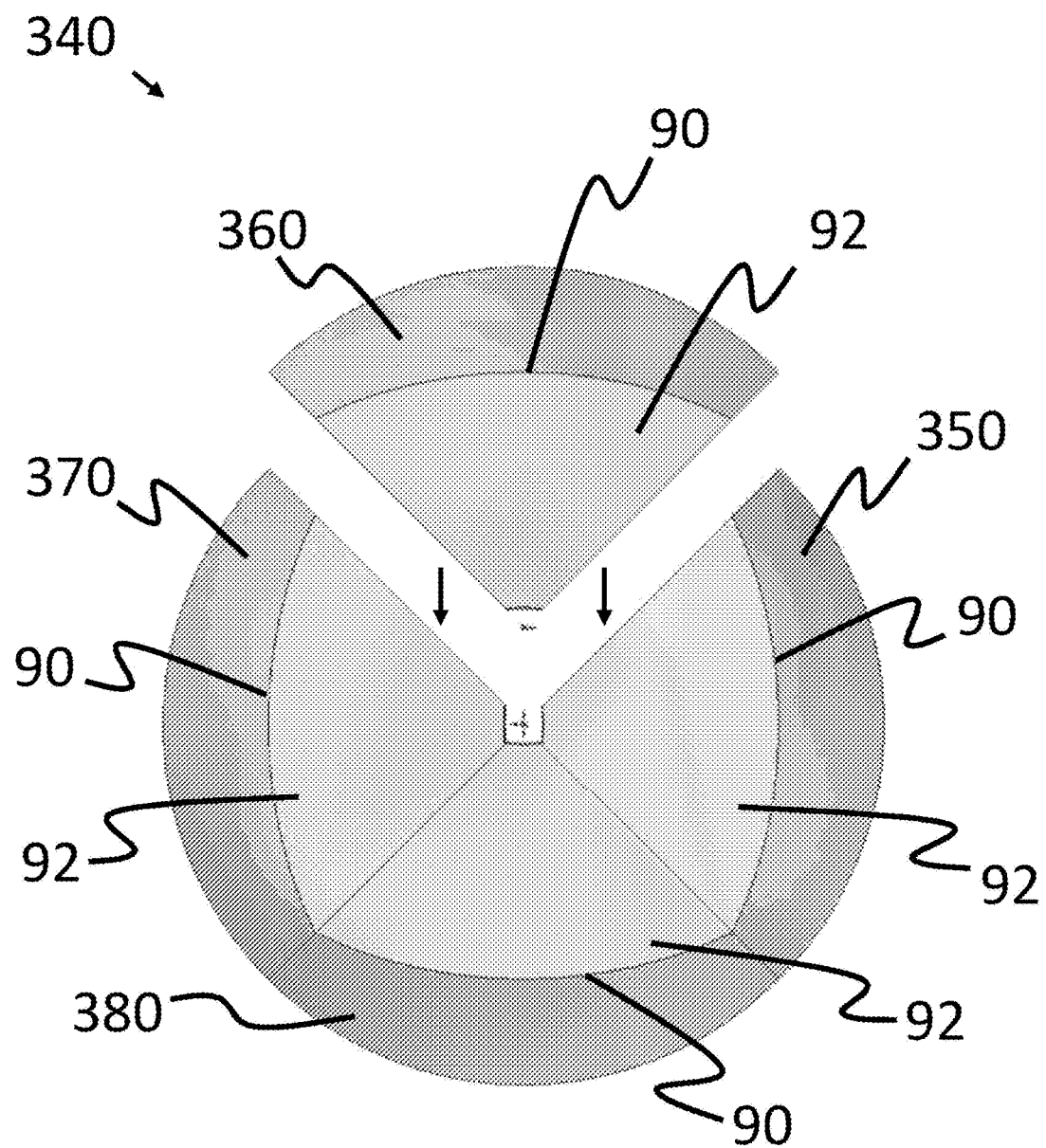
FIG. 8 shows a Top-down View of 4 90-degree Modules Covering a 360-Degree by 90-degree Communication Circumference About a Vehicle in one embodiment of the system of these teachings.
Figure 9:
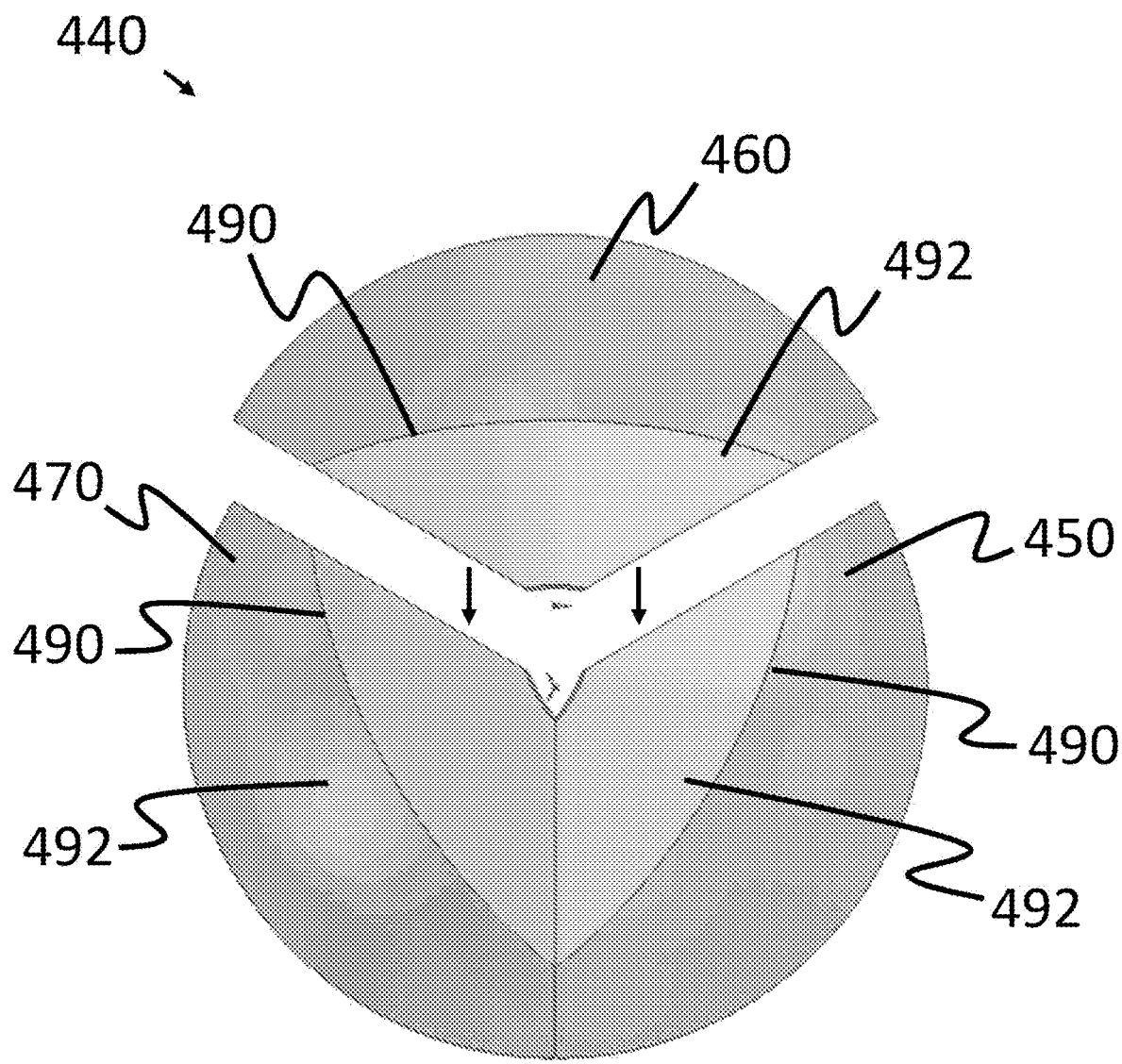
FIG. 9 shows a Top-down View of 3 120-degree Modules Covering a 360-Degree by 120-degree Communication Circumference About a Vehicle in another embodiment of the system of these teachings.

FIGS. 8 and 9 illustrate several spherical tiling embodiments that can be used to cover wider areas or even the full four pi solid angle, using multiple LPASS modules. In embodiment 340 of FIG. 8, 4 90-degree×90-degree LPASS transmit modules 350, 360, 370, and 380, are shown tiled to provide a 360-degree lateral coverage. Two more modules could be used to cover the top and bottom regions, providing full spherical coverage. System 440 of FIG. 9 shows that when three 120-degree×120-degree FOV LPASS modules 450, 460, and 470, are tiled together for 360-degree lateral coverage, there is only a small top and bottom cap region uncovered. Again, these could be covered by two additional modules. Other tiling embodiments of the present teaching follow from these embodiments. U.S. Pat. No. 9,559,774, entitled "Bi-Directional Data and Signal Channels in Optical Interconnects", which shows tiled emitters and detector is incorporated by reference herein in its entirety and for all purposes. While the solid angles shown in these examples are symmetric, any shape or geometry Solid Angles Can Be Filled Using the LPASS Modules.

Referring to FIG. 8, two more modules, one for the top cap and one for the bottom cap, will provide 4-Pi steradian coverage. Alternatively wider field ASSOCLPASS modules can be used such as the 120-degree field case shown in FIG. 9.

Referring to FIG. 9, in this case only a small field is left uncovered in two directions, and additional modules may not be required depending on the application.

Figure 10:
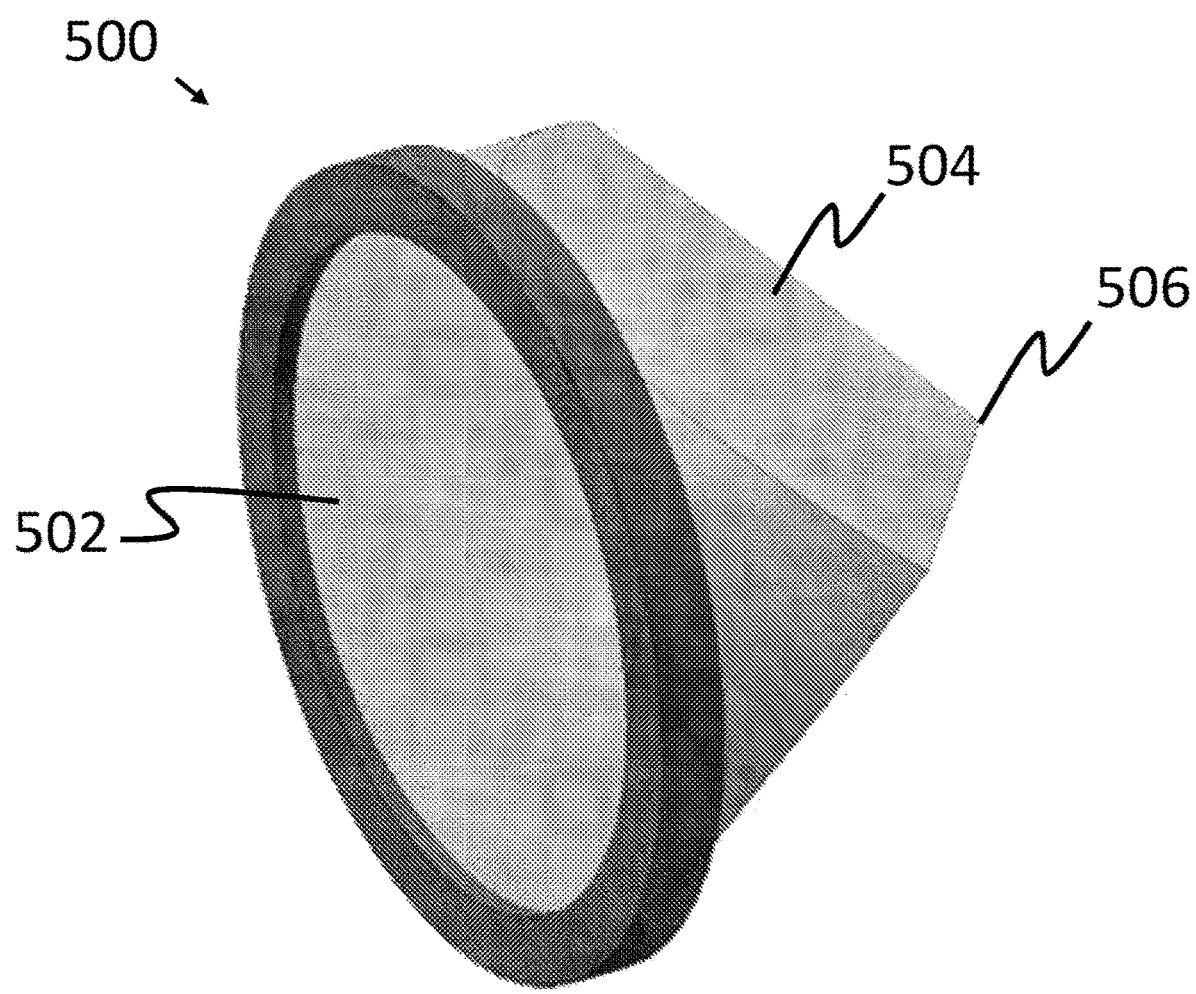
FIG. 10 shows a Corner-Cube Retro-Reflector used in some embodiments of the system of these teachings.

A corner cube retroreflector 500 is illustrated in FIG. 10. The corner cube retroreflector and similar devices retro-reflect light back in the direction of the source and can be used in conjunction with the LPASS technology as described above for vehicle location and tracking.

This and similar devices retro-reflect light back in the direction of the source and can be used in conjunction with the above description for tracking. When a modulator is incorporated in the device 500, it becomes a retromodulator and can transmit data back to the source or first vehicle with an extremely low power requirement in the second vehicle since the second vehicle only modulates the incident light from the first vehicle and does not need to source any optical power. The modulator can be formed One embodiment of a Wavelength Division Multiplexed (WDM) retromodulator of these teachings is described below, and a variation on it to provide very broad angular modulations at one or several wavelengths is particularly useful in conjunction with the LPASS technology, particularly when power is extremely limited on the second vehicle, Or when rapid communication must be established between two vehicles.

In the wavelength division multiplexed (WDM) retromodulator, multichannel capability and allocable bandwidth is obtained by cascading a single or typically up to 5 to 10 or more relatively narrow band reflectance modulators to form independently modulated parallel optical channels which can be simultaneously read at the same time. The retromodulator of these teachings is illustrated in FIG. 11.

Figure 11:
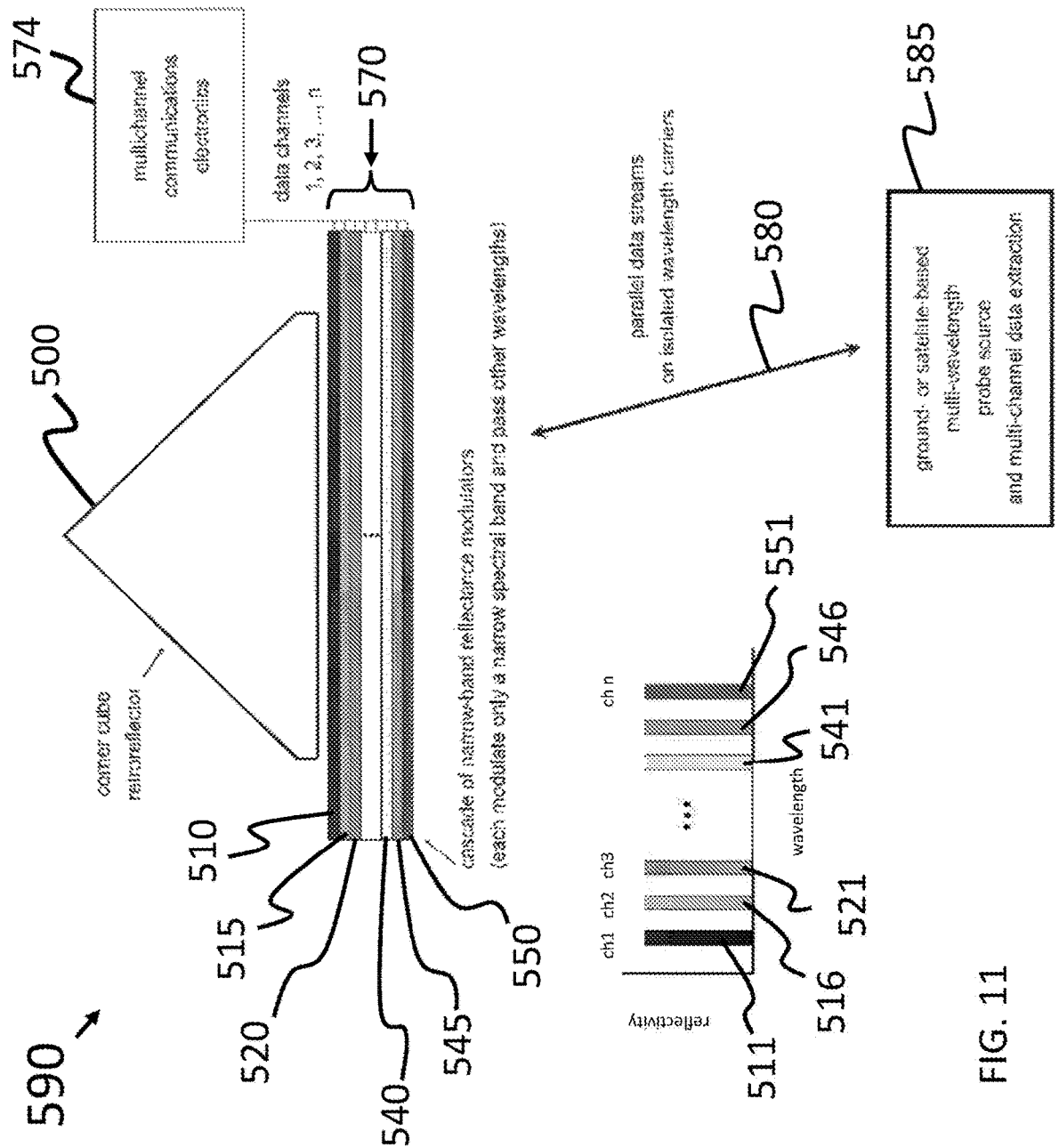
FIG. 11 shows a High Data Rate Retromodulator of these teachings.

In the high data rate retromodulator 590 shown in FIG. 11, one to ten or more narrow-band reflectance modulators (switchable volume holographic mirrors) are cascaded in the aperture of a corner cube retroreflector. A multi-wavelength probe beam is used to simultaneously extract the multichannel data. As shown in the inset, each switchable holographic mirror modulates an isolated narrow spectral band and leaves other wavelengths unaffected—they transmit through nonresonant switchable mirrors with little or no interaction. Separate vehicles or satellites can communicate on different channels, or the channels can be combined in various ways (real time bandwidth allocation) to provide multiples of single-channel bandwidth to needy links.

In the high data rate retromodulator 590, a cascade 570 of narrow-band reflectance modulators 510, 515, 520, . . . , 540, 545, 550 (switchable volume holographic mirrors) are cascaded in the aperture of a corner cube retroreflector 500. These switchable mirrors are driven by multichannel communications electronics 574. A multi-wavelength probe beam 580 is used to simultaneously extract the multichannel data. This probe beam can emanate from vehicle or ground station 585. As shown in the inset, each switchable holographic mirror modulates an isolated narrow spectral band 511, 516, 521, . . . , 541, 546, 551, respectively, and leaves other wavelengths unaffected. Separate satellites can communicate on different channels, or the channels can be combined in various ways (real time bandwidth allocation) to provide multiples of single-channel bandwidth to needy links.

The spectral width of the reflectance bands for each of the cascaded holographic electro-optic mirror modulators can be narrow, and yet still provide for the wavelength tuning over a relatively wide field of view. For the wide angle communication scenarios described earlier where wide FOVs may be required, the WDM modulator described above can be modified to an ultra wide angle retromodulator by spacing the neighboring spectral channels closely and sending the same data to the neighboring channels. In this mode, as one switchable mirror angularly detunes and looses contrast, the neighboring channel spectrally picks up and recovers the contrast.

Figure 12:
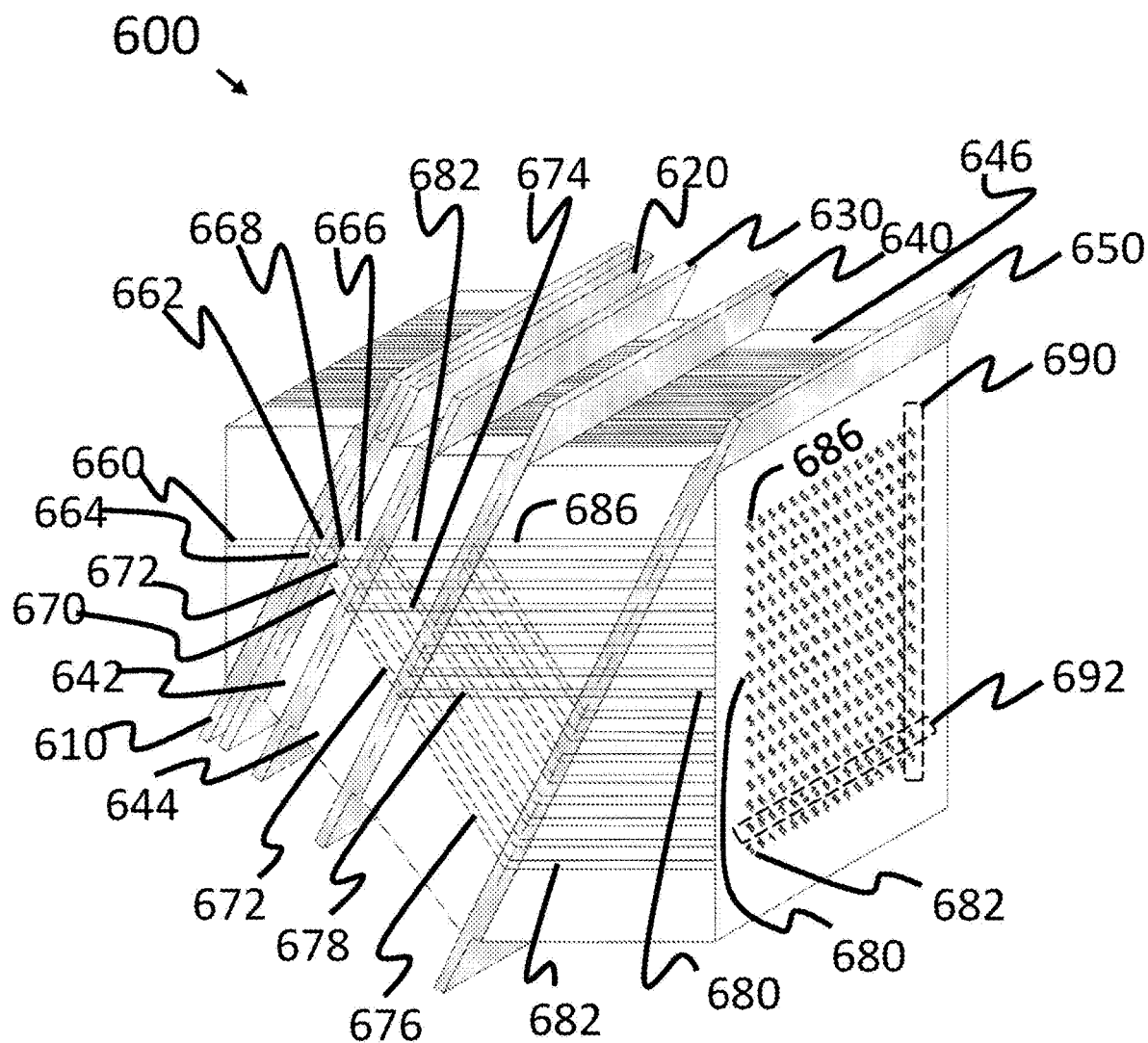
FIG. 12 shows an Optical Switch used in one embodiment of the system of these teachings.

FIG. 12 shows how a rugged monolithic non-mechanical rad-hard switch technology can be used to steer a high power diode or fiber laser output to any element in a dense packed switch output plane. This plane can replace the VCSEL array with a much higher power array. When this is cascaded behind the LPASS imager, the communication range of the LPASS system can be greatly extended.

Referring to FIG. 12, the switch technology shown there in can route the light from a high power diode laser to one of 32×32 positions in a volume not much larger than 1"×1"×1.5". This can replace the VCSEL array with a dense source that contains several watts or more of power per beam. Optical switch 600 of FIG. 12 uses cascaded switchable transmission gratings 610, 620, 630, 640, and 650 to route and input beam from channel 660 to any of the 16 output channels and column 686. The switchable gratings are separated by spacers 642, 644, and 646. The first switchable rating 610 switches the input signal from channel 660 between transmitted channel 662 and diffracted channel 664. Second switchable gratings 620 routes light incident on channel 662 among transmitted channel 666 and 668. If the signal has been routed in channel 664 by the first switchable rating the second six switchable grading routes that light between channels 672 and 670, and so on. There are 15 more input channels directly behind in parallel to channel 660 that work in the same fashion but are independently controlled. An array of 16 pixels or high power sources can be used to drive each of the 16 channels which can therefore be steered to any upper channel in each of the 16 columns about the channels. Alternatively a 1×16 switch using the same technology can be used with a single high-powered laser or source to steer it among any of the 16 inputs to switch 600 which thereby allows routing to any of the 16×16 output channels. The 16×16 output channels can be used to replace the VCSEL arrays in the earlier described embodiments.

Figure 13:
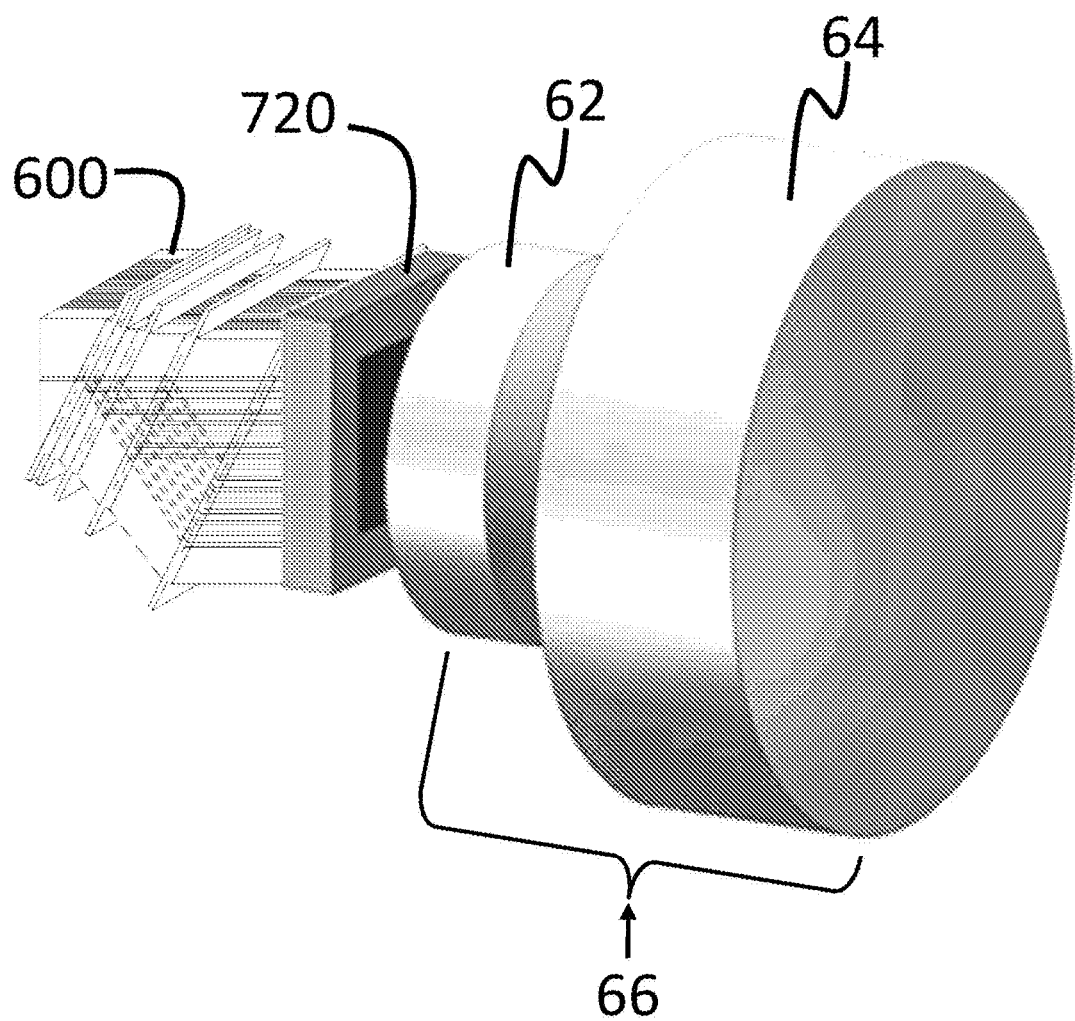
FIG. 13 shows an embodiment of a High Power LPASS Transmitter of these teachings.

Referring to FIG. 13, as described previously the compact optical switch routes one or more high power diode laser output to the dense input array of the infinite conjugate imager 60, effectively replacing the VCSEL array with a much higher power source 720. This can extend the LPASS communication range over mid- to long distances. The output plane of the switch is roughly an inch square.

Other embodiments of these teachings include the retromodulator disclosed above.

The embodiments of the retro-modulator of these teachings shown herein above obtain multichannel capability and allocable bandwidth by cascading 5 to 10 relatively narrow band reflectance modulators to form independently modulated parallel optical channels which can be simultaneously read at the same time.

In one instance, a retromodulator device includes switchable volume holographic mirrors (SVHMs). Switchable volume holographic gratings that exhibit a 10-20 kHz bandwidth and a 20 dB have been demonstrated and can be used in place of the switchable mirrors. These are the same switchable transmission gratings described in system 600. In the grading off for transmitting state the transmission grating is transparent and light propagates into and out of the retro-modulator. To modulate the beam of the corresponding wavelength of the grading off the volume transmission grating is turned on Indians and lightest diffracted at a large angle outside the acceptance of the corner cube prism. The thickness, refractive index modulation, and spatial. Of each of the cascaded volume transmission gratings are selected to interact substantially only with the beam of the corresponding wavelength for that grating modulator.

Optical Properties of Bragg Reflectors

Figure 14:
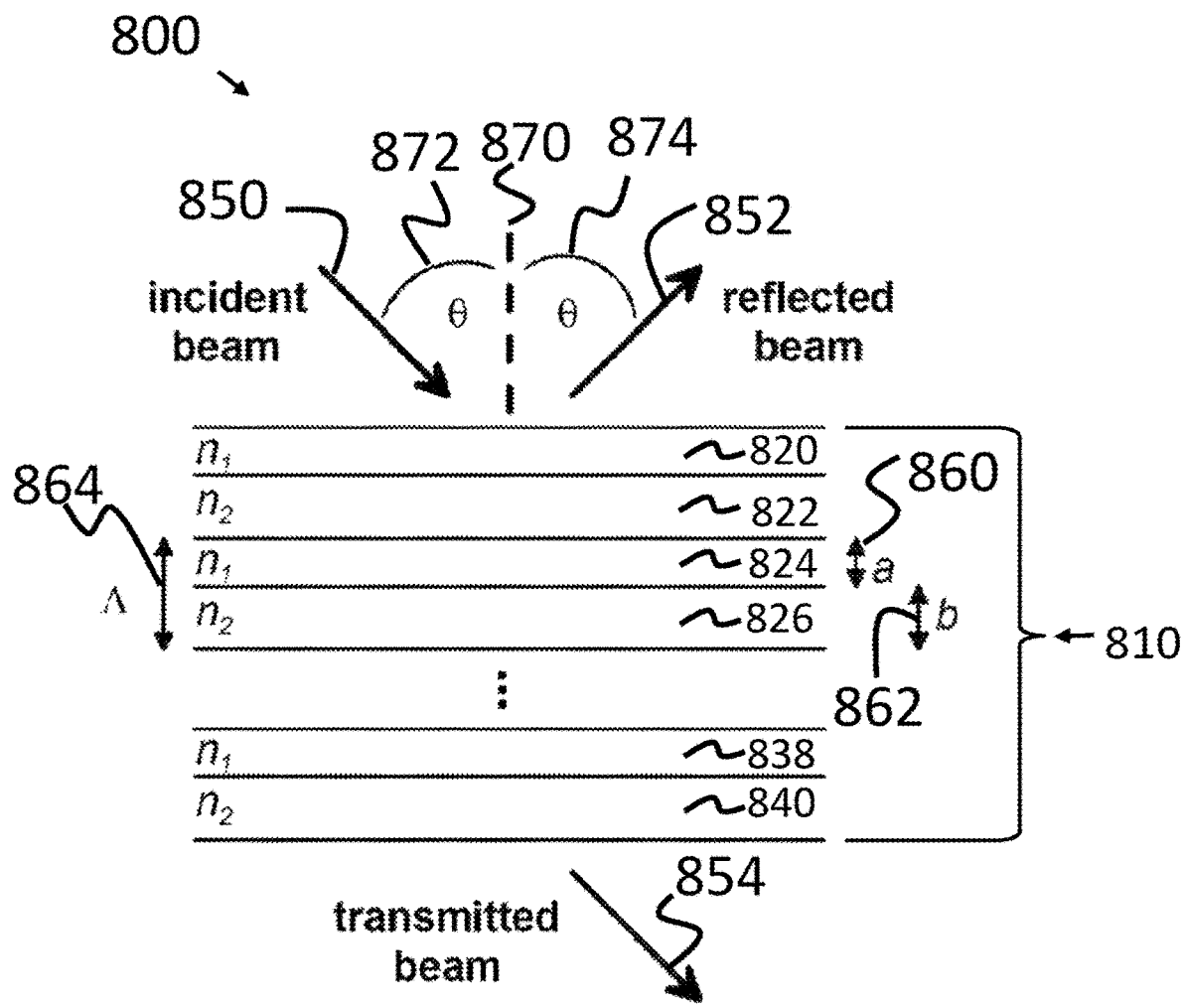
FIG. 14 shows a Structure of a Bragg Reflector used in these teachings.

In one instance, the retromodulator is based on switchable volume holographic mirrors. The relevant optical properties of static Bragg reflectors (BR) are presented here as a background to understanding the switchable holographic mirrors referenced above. In detail, a volume holographic mirror has sinusoidally or otherwise varying refractive index regions (rather than step-index profiles), however, we expect that the major features of the two structures are very similar. Here the simpler dielectric stack model is used for first order properties. A schematic diagram of a Bragg reflector, or switchable holographic mirror BR, is shown in FIG. 14. The BR 800 is comprised of a periodic stack of dielectric film pairs 864 with layer thicknesses 860 and 862 and optical indices $n_1$ and $n_2$, respectively. The spatial period 864 of the structure is $\Lambda=a+b$ and in the present model, the indices of refraction of the media surrounding the BR is taken to be the spatially averaged index of the mirror.

The BR shown in FIG. 14 is comprised of a multilayer stack of dielectric media. The spatial period is $\Lambda=a+b$, where a and b are the thicknesses of layers with indices of refraction $n_1$ and $n_2$, respectively. Such structures act as mirrors over limited wavelength and angular ranges for both TE and TM polarized light, and otherwise transmit light with little loss.

The optical properties of Bragg structures have been described in terms of the physical quantities presented above using coupled mode theory. Such analysis shows that the center wavelength, $\lambda_c$, and spectral bandwidth, $\Delta\lambda$, of the periodic structure for light incident at normal incidence are given by $$\lambda_c = 2\bar{n}\Lambda, \quad (1a)$$

and $$\Delta\lambda = \lambda_c \cdot \left(\frac{2}{\pi}\frac{\Delta n}{\bar{n}}\right), \quad (1b)$$

where $\bar{n}=\sqrt{(n_1^2+n_2^2)/2}$ is the spatially averaged mirror index and $\Delta n=|n_1-n_2|$ is the layer index mismatch. Equation (1a) is a statement of Bragg's law in the optical regime, hence the nomenclature, Bragg reflector.

The analysis shows that the first-order reflectance feature of the structure shown in FIG. 14 is given by $$R = \frac{|\kappa|^2}{s^2\coth^2(sL) + (\Delta\beta/2)^2}, \quad (2)$$

where $s^2=|\kappa|^2-(\Delta\beta/2)^2$, the phase mismatch factor is $\Delta\beta=2k\cos\theta-2\pi/\Lambda$, $k=\bar{n}\omega/c$ is the optical wavenumber, the angle of incidence is $\theta$, the total film thickness is L, and the coupling constants for TE and TM light are given by $$\kappa = i \cdot \frac{2\Delta n}{\lambda\cos\theta} \times \begin{cases} 1 & (TE) \\ \cos(2\theta) & (TM) \end{cases}. \quad (3)$$

Figure 15:
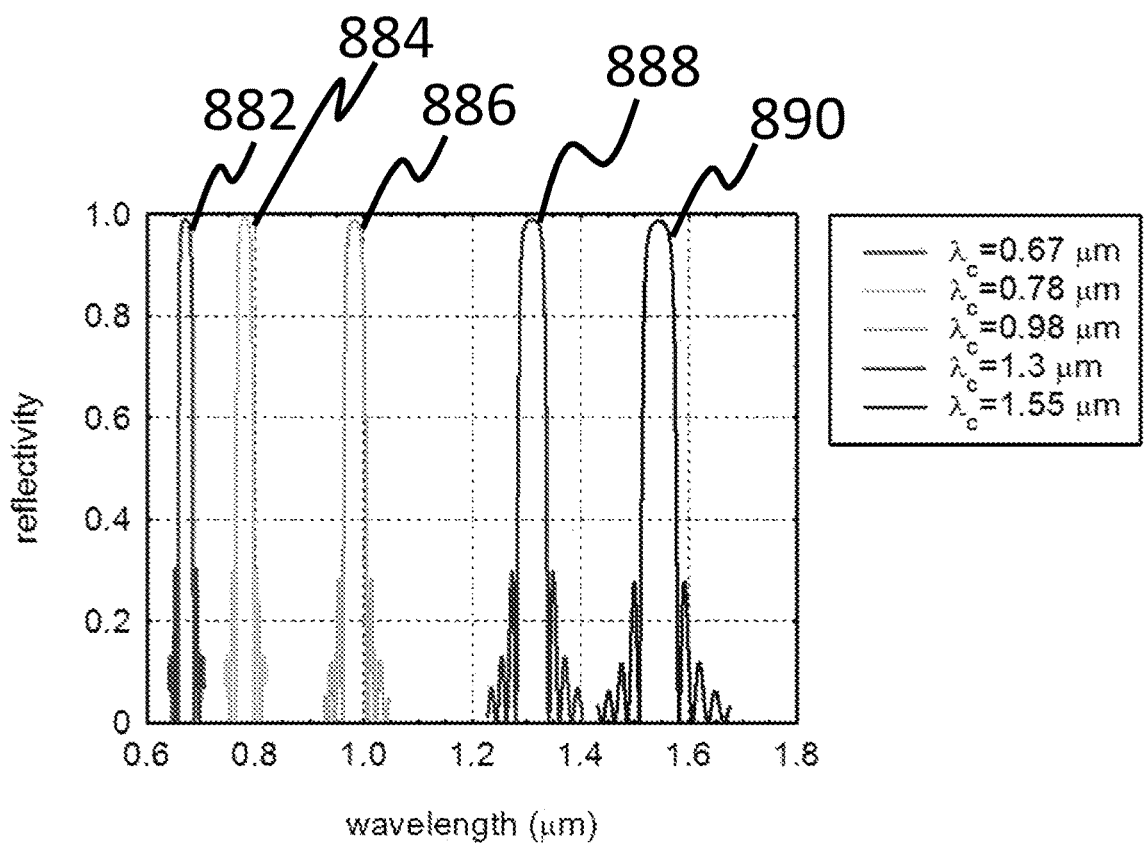
FIG. 15 shows a Plot of Bragg Mirror Reflectance Versus Wavelength at Normal Incidence.

A plot of R versus wavelength is shown in FIG. 15 for normal incidence ($\theta=0$) and $\Delta n/\bar{n}=0.05/1.56$ for 5 different center wavelengths 882, 884, 886, 888, and 890. The wavelengths chosen represent readily available (COTS) laser diode wavelengths. For this calculation we assumed an index mismatch of 0.05, which from our previous work, is readily achievable. The thickness of the PDLC films needed is between 10 and 30 µm, which also readily achievable. These chosen mirror parameters and the figure show that the reflectance varies between 80-93% in the central reflectance band Eq. (1b), and quickly falls to zero at wavelengths only ±2% away from $\lambda_c$. Hence, in the visible, if the BR channels are 15 nm wide, spacing the multiplexed channels every ~30 nm. Would allow room for angular tuning of the bandpass. Thus it is clearly conceivable to stack 10 or more BRs in a WDM retromodulator for an enhancement in bandwidth of the same factor. In fact, it likely will be practical to simply choose commercially available semiconductor laser wavelengths, as shown in FIG. 15.

FIG. 15 shows that good channel discrimination is possible in wavelength multiplexed BRs provided the center wavelength of neighboring channels are separated by a distance equal to ~4% of $\lambda_c$. The wavelengths shown in the figure represent readily available laser diode wavelengths. There is clearly room for additional WDM channels.

The Angular Sensitivity of Multilayer Dielectric Mirrors

At non-normal incidence, the Bragg condition for multilayer periodic mirrors dictates that the reflection band blue-shifts according to $2\bar{n}\Lambda\cos\theta=\lambda_c$. Hence, any laser tuned to a BR modulator will come out of resonance with the structure at large enough angle detuning. The angular field of view (FOV) can be estimated by $\theta=2n\sqrt{\Delta\lambda_{1/2}/\lambda_c}$. For the Bragg reflectors show in FIG. 3 the FOV for the wavelength bands is 25°. By placing the modulated carrier wavelength at the long wave edge of the band, a full-field of angular performance for this case is +/−25 degrees (subtending 50 degrees). The FOV may be enhanced by incorporating a chirp in the BR spatial period.

In summary, the optical performance of BRs is ideally suited for the retromodulator technology, exploiting their strong wavelength sensitivity and relatively large FOV. The following section describes the properties of LC composite media in general terms, and how they may be configured for switchable holographic mirrors.

LC Composite Multilayer Mirrors

Figure 16:
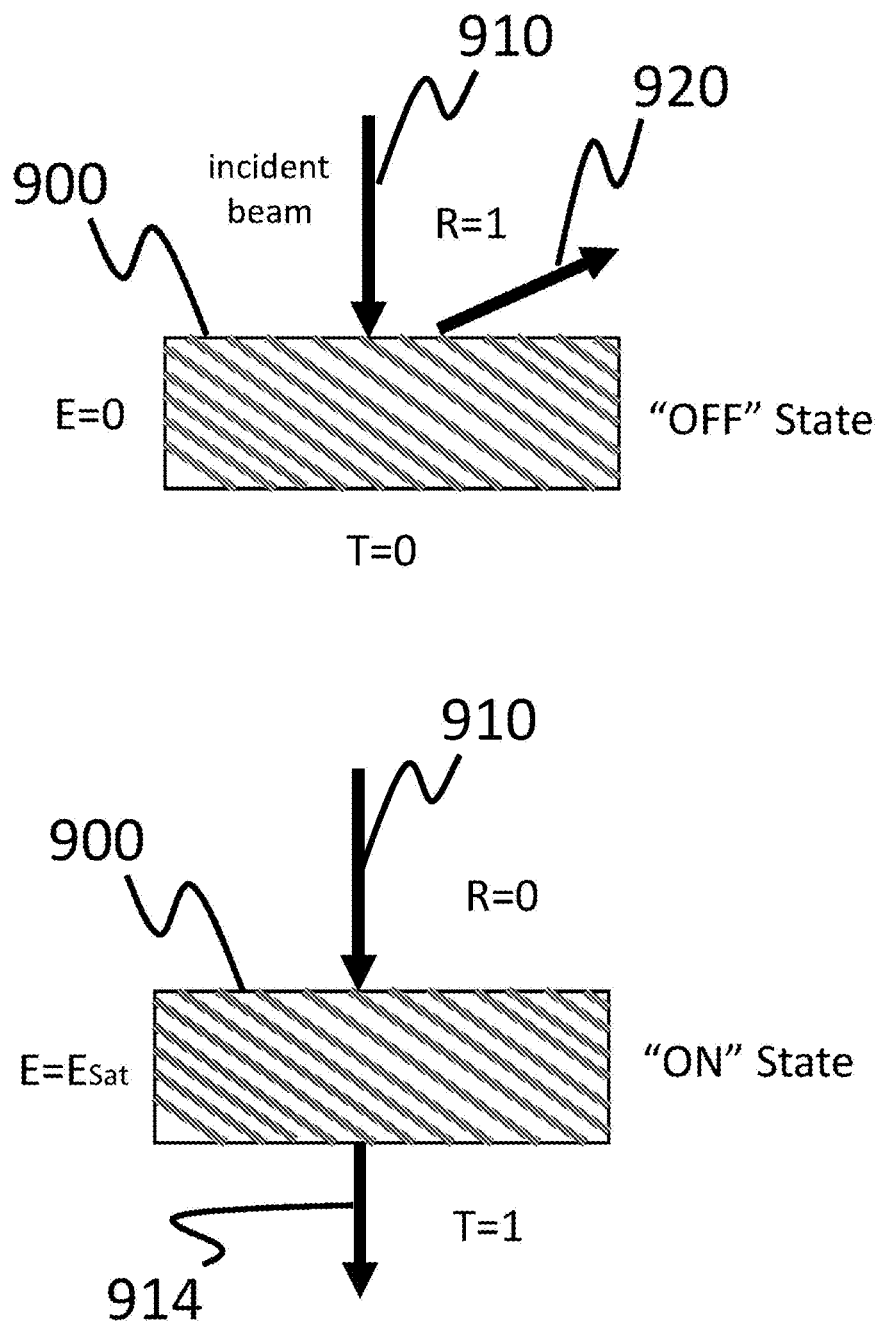
FIG. 16 shows a PDLC Bragg Mirror as used in these teachings.

The nematic-based PDLCs described above can be utilized to construct switchable holographic mirror structures. FIG. 16 shows a schematic diagram of a PDLC switchable holographic mirror 900. The PDLC mirrors can be fabricated holographically. The structures can be a holographic grating with slanted gratings planes. The slant of the grating plane and the Bragg angle are large enough so that the grating operates in the reflective mode rather than in transmission. In the OFF state (i.e. no applied electric field), the refractive index modulation of the grating is expected to be on the order of $\Delta n \sim 0.05$ or greater and incident Bragg-tuned light 910 will be reflected 920. In the ON state, the nematics align along the applied field so that the PDLC material is index matched ($\Delta n = 0$) and the incident light 910 is transmitted 914. In this state, the transmitted light will encounter the corner cube and be subsequently returned along the incident wavevector.

The material system used in these teachings to fabricate switchable diffraction gratings is a polymer dispersed liquid crystal (PDLC). The gratings are formed by polymerization induced phase separation in a liquid crystal/prepolymer mixture. This process takes place when the PDLC material is exposed to spatially inhomogeneous illumination, such as that obtained holographically by two interfering laser beams. These PDLC volume phase holograms exhibit a large EO tuning range due to the combined properties of a high degree of orientational order in of the PDLC grating and a large birefringence intrinsic to the liquid crystal component.

Referring to FIG. 16, In the absence of an applied voltage ("OFF"), indices $\Delta n = 0.05$ and Bragg-tuned incident light 910 is reflected 920 nearly 100%. When a saturating field is applied, the nematic directors reorient so that $\Delta n = 0$ and the incident light 910 is transmitted 914. Rejected light is diffracted (reflected) out of the retroreflector aperture during both the first and second (return) passes through the SVHM stack.

Figure 17:
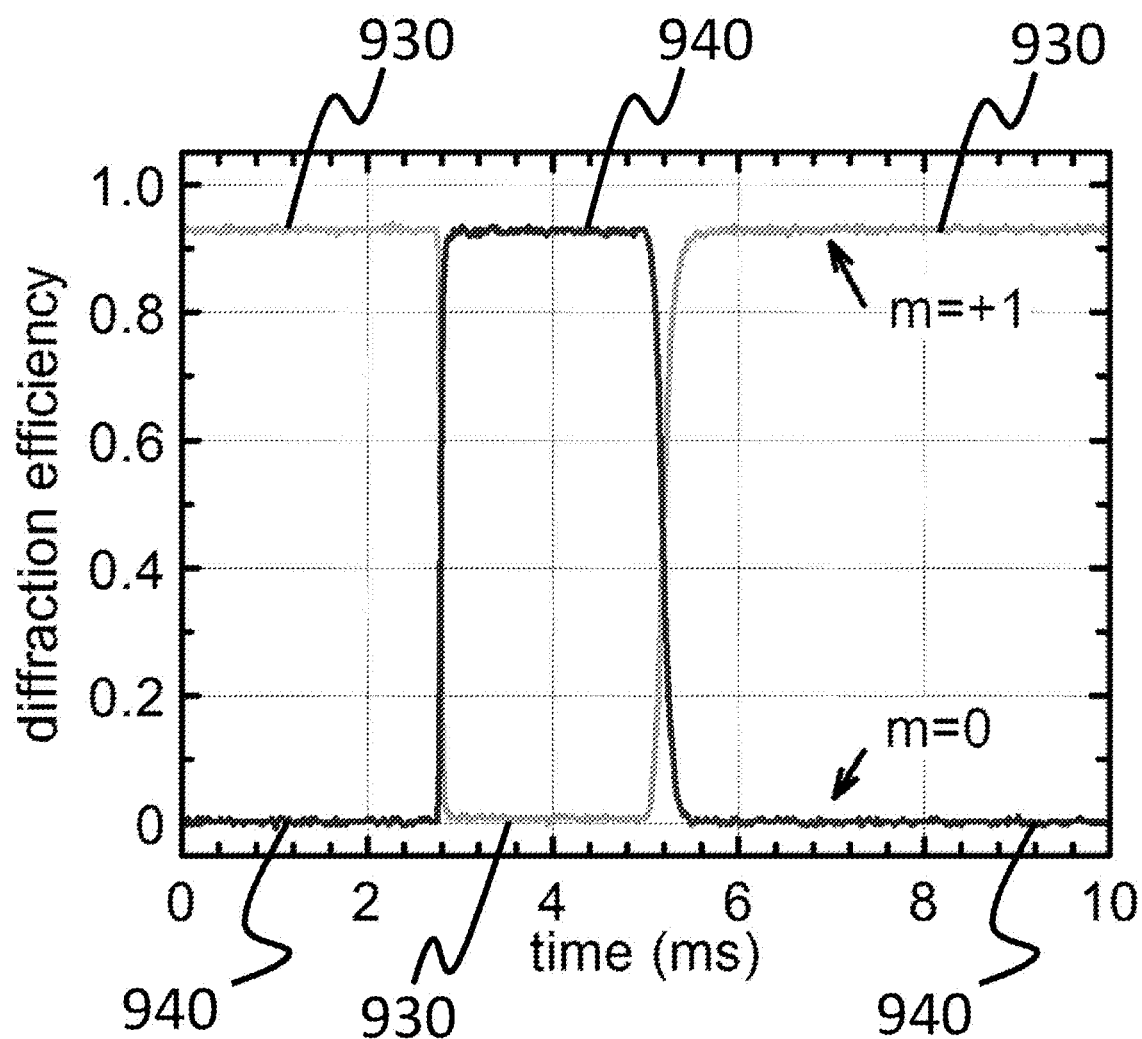
FIG. 17 shows Switching Behavior of a Switchable Volume Holographic PDLC Grating as used in these teachings.

As shown in FIG. 17, Diffracted energy is switched between zero and first orders in this switchable holographic grating. The angular separation between the orders can be very large (e.g., 100 degrees). This switching data (at $\lambda = 1.55$ μm) was obtained using a grating fabricated using the holographic techniques described. These gratings exhibit switching times in the range of 50 to 200 microseconds with high contrast (e.g., 22 dB/grating) and very low insertion loss (0.2 to 0.3 dB/grating).

A example of the switching behavior of the EO diffraction gratings is illustrated in FIG. 17. In the ON state, the switched grating directs the incident p-polarized laser beam at $\lambda = 1.55$ μm into the m=+1 order 930; in the OFF state, the beam is transmitted through the PDLC in the m=0 order 940. In FIG. 17, the graph shows the response of photo-detectors to the zero- and first-order diffracted beams from one of the gratings used in these teachings. Switchable volume holographic gratings that exhibit a 10-20 kHz bandwidth and a 20 dB contrast ratio have been demonstrated. Volume holographic switched gratings with insertion losses as low as 0.2 dB (i.e., diffraction efficiencies on the order of 95%) have also been demonstrated. Similar switching times are expected using switchable mirrors since the size scale of the porous regions in the PDLC host materials are similar to that of the pores in the gratings. Thus by multiplexing N SVHMs, retromodulator device can be constructed with a bandwidth of N×20 kHz with existing technology. If ten such holographic modulators are cascaded, this would correspond to an overall bandwidth of 0.5 MHz. Further, we have tested the switched gratings and found them to be insensitive to "lifetime" doses of space radiation from Cobalt 60.

Figure 18:
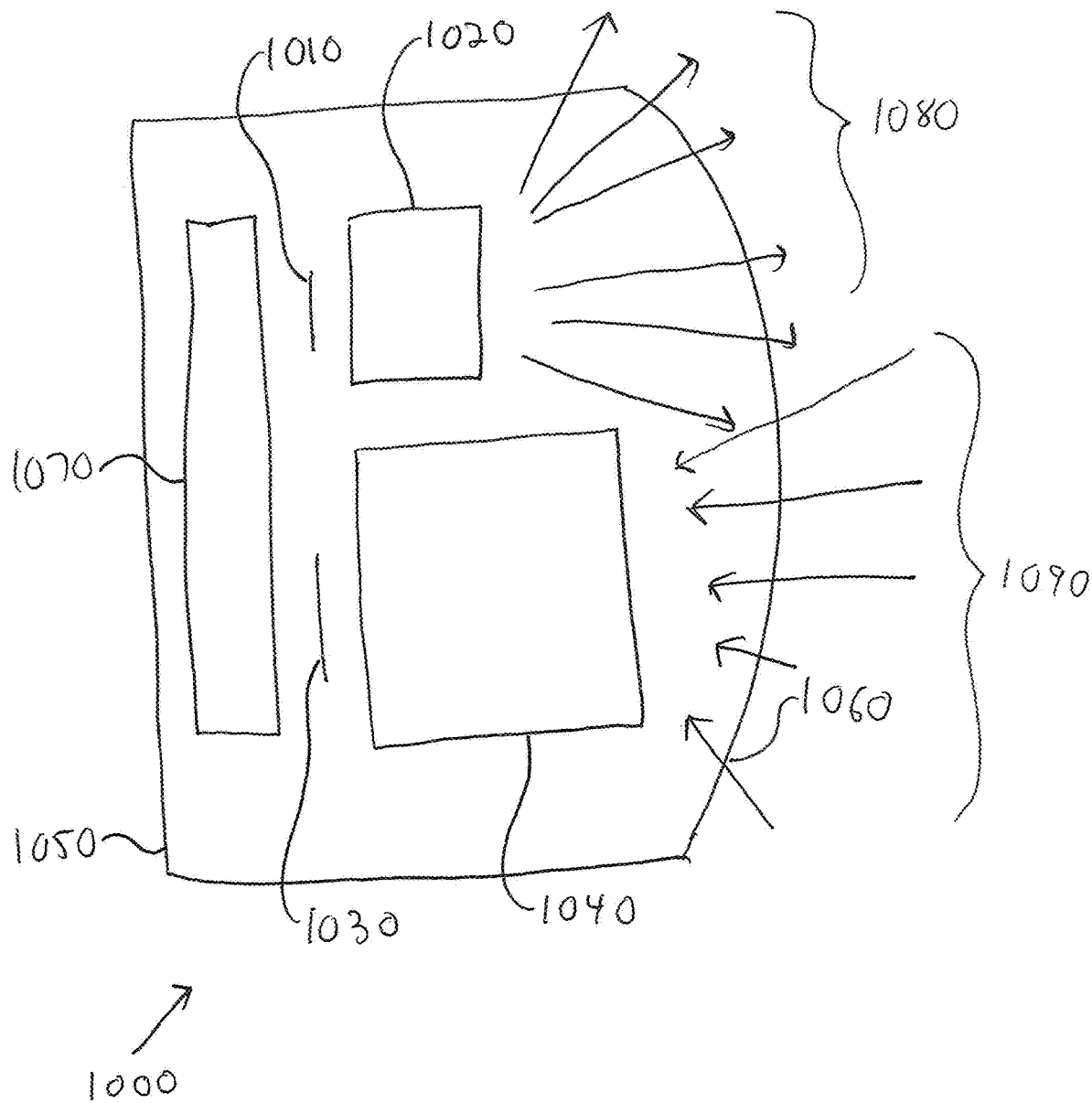
FIG. 18 shows an instantiation of LPASS transceiver module of the present teachings.
Figure 20:
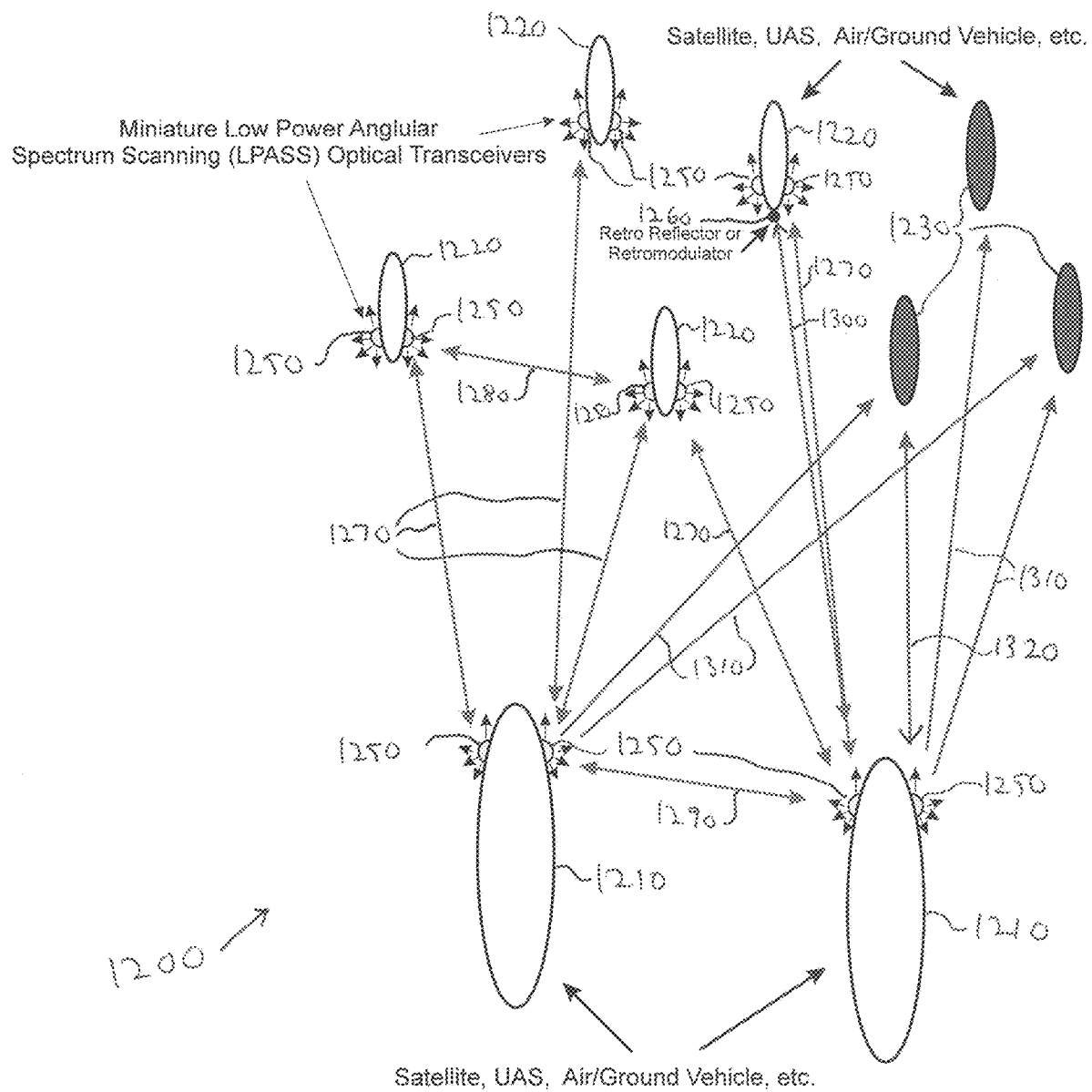
FIG. 20 shows a number of target communicant platforms of these teachings simultaneously communicating with each other.

An LPASS transceiver module instantiation 1000 of the present teachings is shown in FIG. 18. Transceiver module 1000 is shown with optical emitter array 1010 followed by wide angle transmitting optical imager subsystem 1020. Emitter array 1010 can include, but is not limited to, a matrix addressable or independently addressable VCSEL array, or other array of optical emitters, or an output plane of an optical switch that routes one or more optical sources to addressable spatial locations in the emitter array. Since each element of the optical emitter array is used to illuminate a particular solid angle, the aperture of the transmitting optical imaging system 1020 can be very small so long as the diffraction angle from the small imager is not larger than the targeted solid angle element for that emitter. The transmitting optical imaging system 1020 images the output of the various optical emitters in the array into the angular spectrum of beams described earlier, shown here as 1080. Receive imaging system 1040 images each of the possible receive beam angles 1090 into spatial positions on focal plane array 1030. An important feature of this embodiment of these teachings is that the scenarios of tracking and communicating can be performed among many target communicant platforms, each with their transceiver or retroreflector or retromodulator devices simultaneously as shown in FIG. 20. Electronics 1070 is used to manage the send, receive, tracking, identification, and communication as described earlier, among one, two, or many communicant platforms located at different locations about the host of the transceiver module 1000.

Figure 19:
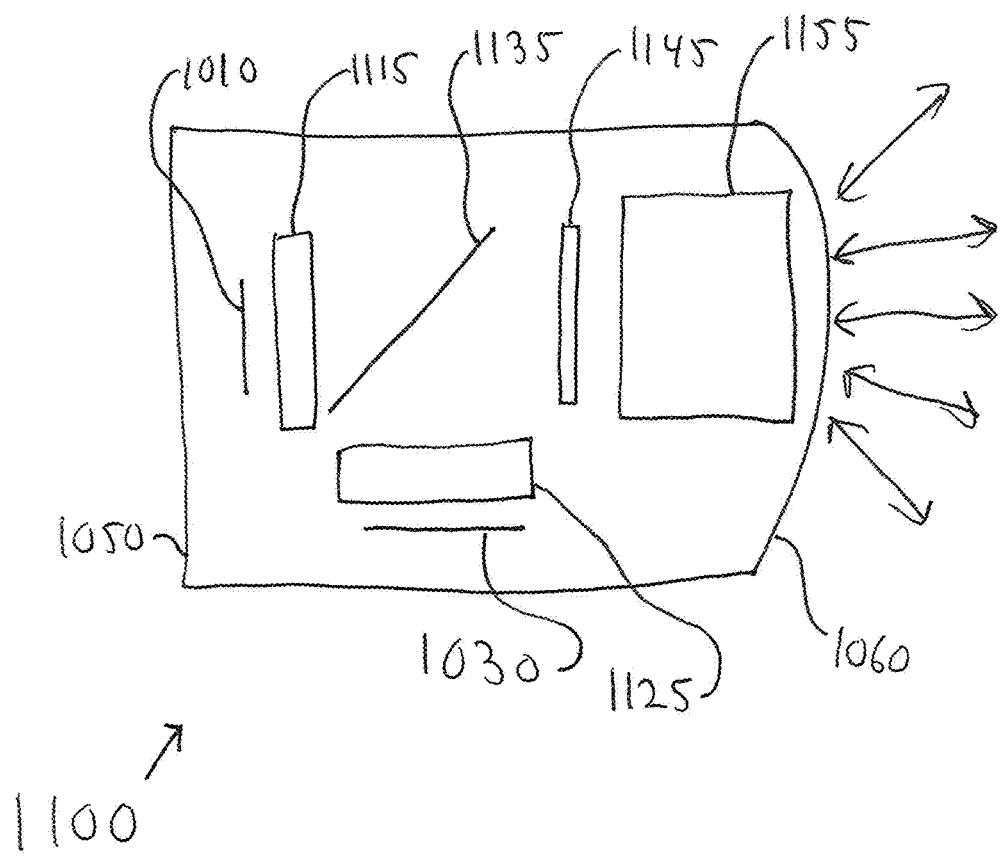
FIG. 19 shows another instantiation of an LPASS transceiver module of the present teachings.

Another instantiation of an LPASS transceiver module is shown in FIG. 19. In this transceiver module 1100, a single bi-directional imaging system 1155 is used for both imaging the outgoing wide angle beams corresponding to output from the emitters in optical emitter array 1010 and also imaging the incoming optical signals on to the focal plane array 1030. Beamsplitter 1135 is used to separate and combine the outgoing and incoming optical paths. Since the space bandwidth product or number of pixels in the emitter array and focal plane array can be very different, optional transmitting optical imaging subsystem 1115 and receiving optical imaging subsystems 1125 can be used to match the fields and spatial resolutions of the emitter array 1010 and focal plane array 1030 to the wide angle imaging system 1155. Mechanical housing 1050 is shown with window 1060.

Multiple functionality and simultaneous multiple channel operating embodiments of the present teachings are shown in FIG. 20. Here platforms 1210, platform 1220, and platforms 1230 are shown each with single or multiple LPASS optical transceiver modules 1250; and/or further with retroreflector or retromodulator modules 1260. The double-ended green arrows 1270 show identification, tracking, and/or communication established between platforms as described earlier. Double-ended green arrow 1300 shows communication between a platform containing an LPASS transceiver module 1250 and a platform containing a retroreflector or retromodulator 1260. Identification, tracking, and communication of these types among platforms is established for purposes including sense-and-avoid, where multiple platforms can avoid collision by identifying or tracking position and distance, as is particularly useful in swarms of platforms such as UAVs; for communication; and for Identification of Friend or Foe (IFF) where return signals and code exchange can identify friendly platforms while no return raises the issue of a non-friendly platform (red platforms in FIG. 20). Bidirectional arrow 1320 illustrates a send signal from a platform 1210 being directly reflected by a non-participating platform 1230 which does not contain an LPASS module or retro device (retroreflector or retromodulator). For short to mid distances the raw reflective signature of another platform when illuminated from an LPASS module can produce a useable signal in the originating LPASS module.

The LPASS approach takes advantage of a dense array of sources (or a single source switched among a dense spatial array of emitting positions such as optical fibers in an array) that is located in the back focal plane of typically an infinite conjugate imager.

As used herein, the singular forms "a," "an," and "the" include the plural reference unless the context clearly dictates otherwise. Except where otherwise indicated, all numbers expressing quantities of ingredients, reaction conditions, and so forth used in the specification and claims are to be understood as being modified in all instances by the term "about."

For the purpose of better describing and defining the present teachings, it is noted that terms of degree (e.g., "substantially," "about," and the like) may be used in the specification and/or in the claims. Such terms of degree are utilized herein to represent the inherent degree of uncertainty that may be attributed to any quantitative comparison, value, measurement, and/or other representation. The terms of degree may also be utilized herein to represent the degree by which a quantitative representation may vary (e.g., ±10%) from a stated reference without resulting in a change in the basic function of the subject matter at issue.

Although embodiments of the present teachings have been described in detail, it is to be understood that such embodiments are described for exemplary and illustrative purposes only. Various changes and/or modifications may be made by those skilled in the relevant art without departing from the spirit and scope of the present disclosure as defined in the appended claims.

What is claimed is:

1. A system for initiating communication between two vehicles, the system comprising:

a transmitting vehicle sub-system comprising: an optical source;

an optical switching component configured to direct output from the optical source among an array of spatial positions in an output plane; wherein the switching component comprises a number of cascaded switchable transmission gratings; the number of cascaded switchable transmission gratings receiving an input beam from the optical source and routing the input beam to one spatial position from the array of spatial positions;

an infinite-conjugate imaging optical subsystem having a focal plane, said output plane being located at an image plane of the imaging optical subsystem; the infinite conjugate imaging optical subsystem imaging each spatial position from the array of spatial positions into a predetermined direction;

one or more detectors; and a second wide-angle imaging optical subsystem; the second wide-angle imaging optical subsystem imaging a predetermined solid angle onto one of one or more detectors;

and a receiving vehicle sub-system comprising a retromodulator.

2. The system of claim 1 wherein the retromodulator comprises: a corner retroreflector; and a number of narrowband reflectance modulators cascaded in the aperture of the corner retroreflector.

3. The system of claim 2 wherein at least some of the number of narrowband reflectance modulator comprise switchable volume holographic elements.

4. The system of claim 3 wherein the switchable volume holographic element comprises polymer dispersed liquid crystals.

5. The system of claim 1 wherein the optical source is a fiber laser.

6. The system of claim 1 wherein the switching component comprises an optical switch switching an input beam from the optical source among optical fibers in an array.

* * * * *